United States Patent
Ukidwe

(10) Patent No.: US 11,220,562 B2
(45) Date of Patent: Jan. 11, 2022

(54) POLY(VINYL ACETAL) RESIN COMPOSITIONS, LAYERS, AND INTERLAYERS HAVING ENHANCED PROPERTIES

(71) Applicant: SOLUTIA INC., St. Louis, MO (US)

(72) Inventor: Nandan U Ukidwe, Suffield, CT (US)

(73) Assignee: Solutia Inc., St. Louis, MO (US)

(*) Notice: Subject to any disclaimer, the term of this patent is extended or adjusted under 35 U.S.C. 154(b) by 668 days.

(21) Appl. No.: 15/728,719

(22) Filed: Oct. 10, 2017

(65) Prior Publication Data

US 2019/0106514 A1    Apr. 11, 2019

(51) Int. Cl.
| | |
|---|---|
| C08F 16/38 | (2006.01) |
| B32B 17/10 | (2006.01) |
| B32B 27/28 | (2006.01) |
| C08K 5/00 | (2006.01) |

(52) U.S. Cl.
CPC ........ *C08F 16/38* (2013.01); *B32B 17/10036* (2013.01); *B32B 17/10761* (2013.01); *B32B 27/28* (2013.01); *C08K 5/0016* (2013.01); *B32B 2307/546* (2013.01)

(58) Field of Classification Search
CPC ............... C08F 16/38; B32B 17/10036; B32B 17/10761; B32B 27/28; B32B 2307/546; C08K 5/0016
USPC ........................................................ 524/557
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins et al. | |
| 5,190,826 A | 3/1993 | Asahina et al. | |
| 7,563,516 B2 | 7/2009 | Matsudo | |
| 8,470,908 B2 | 6/2013 | Frank | |
| 8,597,792 B2 | 12/2013 | Meise et al. | |
| 8,920,930 B2 | 12/2014 | Meise et al. | |
| 9,248,599 B2 | 2/2016 | Chan et al. | |
| 9,248,626 B2 | 2/2016 | Lu | |
| 9,636,894 B2 | 5/2017 | Lu | |
| 9,669,605 B2 | 6/2017 | Ukidwe et al. | |
| 9,724,899 B2 | 8/2017 | Ma et al. | |
| 9,758,662 B2 | 9/2017 | Ma et al. | |
| 9,926,431 B2 | 3/2018 | Ukidwe et al. | |
| 2013/0022825 A1 | 1/2013 | Meise et al. | |
| 2013/0148263 A1 | 6/2013 | Shimazumi | |

(Continued)

FOREIGN PATENT DOCUMENTS

WO    WO 2016 094205 A1    6/2016

OTHER PUBLICATIONS

Notification of Transmittal of the International Search Report and the Written Opinion of the International Searching Authority, or the Declaration dated Jan. 31, 2019 received in International Application No. PCT/US2018/053017.

(Continued)

*Primary Examiner* — Ling Siu Choi
*Assistant Examiner* — Ronald Grinsted
(74) *Attorney, Agent, or Firm* — Michelle Bugbee

(57) ABSTRACT

Resin compositions, layers, and interlayers comprising a poly(vinyl acetal) resin that includes residues of an aldehyde other than n-butyraldehyde are provided. Such compositions, layers, and interlayers can exhibit enhanced or optimized properties as compared to those formulated with comparable poly(vinyl n-butyral) resins.

18 Claims, 7 Drawing Sheets

(56) References Cited

U.S. PATENT DOCUMENTS

| | | |
|---|---|---|
| 2013/0236711 A1 | 9/2013 | Lu |
| 2016/0159047 A1 | 6/2016 | Ma et al. |
| 2016/0159049 A1* | 6/2016 | Lu .................... B32B 17/10036 |
| | | 428/515 |
| 2016/0159051 A1 | 6/2016 | Lu et al. |
| 2016/0160024 A1 | 6/2016 | Ma et al. |
| 2016/0160031 A1* | 6/2016 | Karagiannis ............ C08L 29/14 |
| | | 428/437 |
| 2016/0160032 A1* | 6/2016 | Ukidwe .................. B32B 27/36 |
| | | 428/212 |

OTHER PUBLICATIONS

Notification of Transmittal of the International Search Report and the Written Opinion of the International Searching Authority, or the Declaration dated Jan. 31, 2019 received in International Application No. PCT/US2018/053021.

Notification of Transmittal of the International Search Report and the Written Opinion of the International Searching Authority, or the Declaration dated Jan. 31, 2019 received in International Application No. PCT/US2018/053857.

Wade, Bruce.; "Vinyl Acetal Polymers"; Encyclopedia of Polymer Science & Technology; 2016; 22 pages.

Zhou, Z. M. et al.; "Synthesis Characterization and Miscibility of Polyvinyl Butyrals of Varying Vinyl Alcohol Contents"; Turkish Journal of Chemistry; 21(4); Jan. 1997; pp. 229-238.

Co-pending U.S. Appl. No. 15/728,736, filed Oct. 10, 2017; Nandan Ukidwe et al.

Co-pending U.S. Appl. No. 15/728,671, filed Oct. 10, 2017; Nandan Ukidwe.

* cited by examiner

POLY(VINYL ACETAL) RESIN COMPOSITIONS, LAYERS, AND INTERLAYERS HAVING ENHANCED PROPERTIES

BACKGROUND

1. Field of the Invention

This disclosure relates to polymer resins and interlayers, in particular, to polymer resins suitable for use in polymer interlayers, including those utilized in multiple layer panels.

2. Description of Related Art

Poly(vinyl butyral) (PVB) is often used in the manufacture of polymer sheets that can be used as interlayers in multiple layer panels, including, for example, light-transmitting laminates such as safety glass or polymeric laminates. PVB is also used in photovoltaic solar panels to encapsulate the panels which are used to generate and supply electricity for commercial and residential applications.

Safety glass generally refers to a transparent laminate that includes at least one polymer sheet, or interlayer, disposed between two sheets of glass or other rigid substrate. Safety glass is often used as a transparent barrier in architectural and automotive applications, and one of its primary functions is to absorb energy resulting from impact or a blow without allowing penetration of the object through the glass and to keep the glass bonded even when the applied force is sufficient to break the glass. This prevents dispersion of sharp glass shards, which minimizes injury and damage to people or objects within an enclosed area. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable sound insulation properties has also been produced, which results in quieter internal spaces.

Poly(vinyl acetal) resins typically include acetate pendant groups, hydroxyl pendant groups, and aldehyde pendant groups, such as n-butyraldehyde groups for a PVB resin, that are present along the vinyl polymer backbone. Properties of poly(vinyl acetal) resins are determined, in part, by the type(s) and relative amount of hydroxyl, acetate, and aldehyde groups and/or by the type and amount of plasticizer added to the resin. Therefore, selection of certain resin compositions and combination of those resins with various types and amount of plasticizers can provide resin compositions, layers, and interlayers having different properties.

However, such selections can have various drawbacks. For example, PVB resin compositions having high residual hydroxyl contents and low plasticizer contents tend to have higher glass transition temperatures, which make such resins desirable in safety performance applications. However, these resins exhibit very poor vibration dampening and sound attenuation performance. Similarly, PVB resin compositions having lower residual hydroxyl contents and higher amounts of plasticizer may exhibit good vibration and sound dampening properties, but typically have limited, if any, impact resistance over a broad temperature range.

Thus, a need exists for polymer resins that exhibit multiple desirable properties and that have mechanical, optical, and/or acoustic properties that can be adjusted as needed so that the resin can be utilized in a wide variety of applications. Additionally, a need exists for resin compositions, layers, and interlayers including such resins, which can be employed in several end uses, including in safety glass, structural applications and as polymeric laminates.

SUMMARY

One embodiment of the present invention concerns an interlayer comprising: a resin layer comprising a poly(vinyl acetal) resin and a plasticizer, wherein the poly(vinyl acetal) resin has a residual hydroxyl content of at least 22 weight percent and comprises at least 10 weight percent of residues of at least one aldehyde other than n-butyraldehyde, based on the total weight of aldehyde residues of the poly(vinyl acetal) resin, and wherein the resin layer has a glass transition temperature greater than 45° C.

Another embodiment of the present invention concerns an interlayer comprising: a resin layer comprising: a poly(vinyl acetal) resin, wherein the poly(vinyl acetal) resin has a residual hydroxyl content of at least 24 weight percent and comprises at least 50 weight percent of residues of at least one aldehyde other than n-butyraldehyde, based on the total weight of aldehyde residues of the poly(vinyl acetal) resin, and from 5 to 30 phr of a plasticizer, and wherein the resin layer has a glass transition temperature greater than 45° C.

Yet another embodiment of the present invention concerns An interlayer comprising: a resin layer comprising: a poly(vinyl acetal) resin, wherein the poly(vinyl acetal) resin has a residual hydroxyl content of at least 24 weight percent and comprises at least 50 weight percent of residues of iso-butyraldehyde or pivaldehyde, based on the total weight of aldehyde residues of the poly(vinyl acetal) resin, and from 5 to 20 phr of a plasticizer, and wherein the resin layer has a glass transition temperature greater than 50° C.

Another embodiment of the invention concerns a multilayer glass panel comprising the interlayer of the invention.

Still another embodiment of the invention concerns a method of making the interlayer of the invention.

DESCRIPTION OF THE DRAWINGS

Various embodiments of the present invention are described in detail below with reference to the attached drawing Figures, wherein.

DETAILED DESCRIPTION

Figure 1:
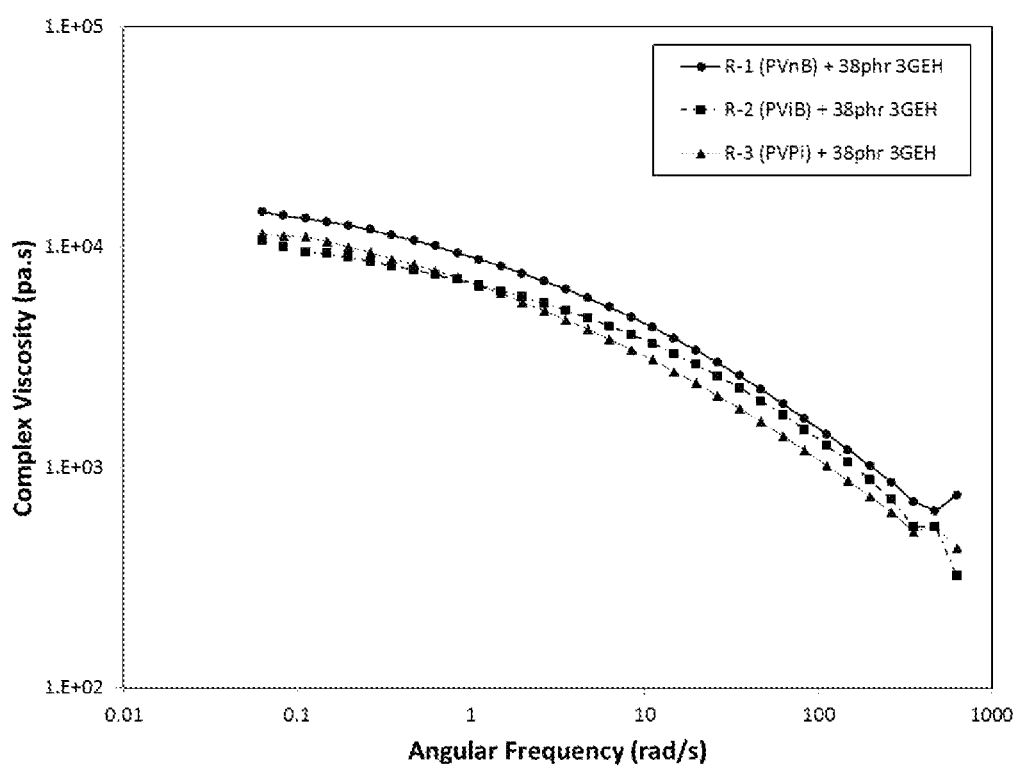
FIG. 1 is a graph depicting complex viscosity vs the angular frequency of plasticized PVnB, PViB and PVPi.

The present invention relates to polymer resin compositions, layers, and interlayers that include at least one poly (vinyl acetal) resin that exhibits different (and often improved) properties than a conventional poly(vinyl n-butyral) (PVB or PVnB) resin, but that can be used in many of the same applications as PVnB and in combination with conventional PVnB, including, for example, safety glass applications. As used herein, PVB and PVnB both refer to conventional poly(vinyl n-butyral) and may be used interchangeably throughout. Resins, compositions, layers, and interlayers according to various embodiments of the present invention may have different glass transition temperatures, different refractive indices, and/or different viscosities or other properties than comparable poly(vinyl acetal) resins that only include residues of n-butyraldehyde. As a result, the resins, compositions, layers, and interlayers described herein may also exhibit enhanced optical, mechanical, and/or acoustic performance. Methods for producing resins, compositions, layers, and interlayers having optimized properties according to various embodiments of the present invention are also described herein.

There is a need for resins, compositions and interlayers that are optically clear (for example, having low HLD haze) while also having improved stiffness and rigidity. Also needed are resins, compositions and interlayers with both high flow and high stiffness or rigidity. Disclosed herein are interlayers and multiple layer panels having these and other improved properties.

In embodiments, the plasticizer is present in the resin layer in an amount in the range of from 5 to 30 phr and wherein the glass transition temperature of the resin layer is at least 46° C., or the plasticizer is present in the resin layer in an amount in the range of from 5 to 20 phr or not more than 20 phr and wherein the glass transition temperature of the resin layer is at least 47° C. or at least 50° C. or at least 55° C.

In other embodiments, the poly(vinyl acetal) resin has a residual hydroxyl content of at least 24 weight percent and comprises at least 10 weight percent of residues of at least one aldehyde other than n-butyraldehyde, based on the total weight of aldehyde residues of the poly(vinyl acetal) resin or at least 50 or at least 75 weight percent of residues of at least one aldehyde other than n-butyraldehyde, based on the total weight of aldehyde residues of the poly(vinyl acetal) resin. In other embodiments, wherein the poly(vinyl acetal) resin has a residual hydroxyl content of at least 27 weight percent and comprises at least 50 or at least 75 weight percent of residues of at least one aldehyde other than n-butyraldehyde, based on the total weight of aldehyde residues of the poly(vinyl acetal) resin.

In embodiments, the residues of at least one aldehyde other than n-butyraldehyde is iso-butyraldehyde or pivalaldehyde.

In embodiments, the interlayer has a storage modulus, G', at 20° C. of at least 300 MPa, and a storage modulus, G', at 50° C. of at least 10 MPa (as measured by DMTA at a measurement frequency of 1 Hz and sweep rate of 3° C./min), or the interlayer has a storage modulus, G', at 20° C. and a measurement frequency of $3.33 \times 10^{-3}$ Hz of at least 250 MPa, and storage modulus, G', at 20° C. and a measurement frequency of $5.56 \times 10^{-4}$ Hz of at least 200 MPa (as measured by DMTA at a sweep rate of 3° C./min).

The risks posed by hurricane and tornados have prompted several states to adopt regulations requiring that the design of fenestration products provide protection and withstand damage caused by high winds, pressures and wind-born debris. One of the key design considerations in these applications is the post-glass breakage behavior of the laminated glass panel or glazing. In the post-glass breakage state, one or both glass panes are accidentally broken, rendering the pane(s) less efficient in bearing loads exerted upon them, and the mechanical properties of the interlayer must assume greater significance (and load). An interlayer that can withstand higher load for the same deflection or the same load for a smaller deflection is more desirable for this type of application. Furthermore, an interlayer than can maintain mechanical strength over longer durations and/or at higher temperatures are also more desirable. The post-glass breakage bending stiffness at the ultimate load is defined as the point at which the laminate breaks. In embodiments, the post-glass breakage bending stiffness at the ultimate load is at least 3.0, at least 3.1, at least 3.2, at least 3.4, at least 3.6, at least 3.8, at least 4.0, at least 4.2, at least 4.4, at least 4.6, at least 4.8, at least 5.0, at least 5.1, at least 5.3, or at least 5.5 N/mm or more for a laminate having an interlayer that is about 2.29 mm thick. In embodiments, the post-glass breakage bending stiffness at the ultimate load is at least 3.0, at least 3.1, at least 3.2, at least 3.4, at least 3.6, at least 3.8, at least 4.0, at least 4.2, at least 4.4, at least 4.6, at least 4.8, at least 5.0, at least 5.1, at least 5.3, or at least 5.5 N/mm or more for a laminate having an interlayer that is about 2.29 mm thick overall and having a core or second layer that is about 1.53 mm thick.

As used herein, the terms "polymer resin composition", "polymer composition" and "resin composition" refer to compositions that include one or more polymer resins. Polymer compositions may optionally include other components, such as plasticizers and/or other additives. As used herein, the terms "polymer resin layer", "polymer layer" and "resin layer" refer to one or more polymer resins, optionally combined with one or more plasticizers, that have been formed into a polymeric sheet. Again, resin layers may include one or more additional additives. As used herein, the term "interlayer" refers to a single or multiple layer polymer sheet suitable for use with at least one rigid substrate to form a multiple layer panel. The terms "single-sheet" and "monolithic" interlayer refer to interlayers formed of one single resin sheet, while the terms "multiple layer" and "multi-layer" interlayer refer to interlayers having two or more resin sheets that are coextruded, laminated, or otherwise coupled to one another.

Resin compositions, layers, and interlayers according to various embodiments of the present invention can include at least one poly(vinyl acetal) resin. Poly(vinyl acetal) resins can be formed by aqueous or solvent-based acetalization of poly(vinyl alcohol) with one or more aldehydes in the presence of an acid catalyst. The resulting resin can then be separated, stabilized, and dried according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.). The total amount of residual aldehyde groups, or residues, present in the resulting poly(vinyl acetal) resin can be at least about 50, at least about 60, at least about 70, at least about 75, at least about 80, at least about 85, at least about 90, at least about 92 weight percent, as measured by ASTM D1396. The total amount of aldehyde residues in a poly(vinyl acetal) resin can be collectively referred to as the acetal component, with the balance of the poly(vinyl acetal) resin comprising residual hydroxyl or acetate groups, which will be discussed in further detail below.

When the poly(vinyl acetal) resin is a conventional poly (vinyl n-butyral) (PVnB) resin, greater than 90, at least about 95, at least about 97, or at least about 99 percent, by weight, of the acetal component, or total aldehyde residues, may comprise residues of n-butyraldehyde. Additionally, a conventional poly(vinyl n-butyral) resin may comprise less than 10, not more than about 5, not more than about 2, not more than about 1, or not more than about 0.5 weight percent of residues of an aldehyde other than n-butyraldehyde, based on the total weight of aldehyde residues of that resin.

Resins, compositions, layers, and interlayers according to embodiments of the present invention can include at least one poly(vinyl acetal) resin that comprises at least about 10 weight percent of residues of an aldehyde other than n-butyraldehyde. In some embodiments, the poly(vinyl acetal) resin may include at least about 15, at least about 20, at least about 30, at least about 40, at least about 50, at least about 60, at least about 70, at least about 80, at least about 90, at least about 95, or at least about 99 weight percent of residues of an aldehyde other than n-butyraldehyde, based on the total weight of aldehyde residues of the poly(vinyl acetal) resin. This resin may also include not more than about 10, not more than about 5, not more than about 2, or not more than about 1 weight percent of residues of n-butyraldehyde, based on the total weight of aldehyde residues of the poly(vinyl acetal) resin.

When the poly(vinyl acetal) resin includes residues of one or more aldehydes other than n-butyraldehyde, any suitable aldehyde can be used. In some embodiments, the aldehyde other than n-butyraldehyde can comprise, for example, an aldehyde having between 1 and 12 carbon atoms per molecule (i.e., a $C_1$ to $C_{12}$ aldehyde), an aldehyde having between 2 and 10 carbon atoms per molecule (i.e., a $C_2$ to $C_{10}$ aldehyde), or an aldehyde having between 3 and 8 carbon atoms per molecule (i.e., a $C_3$ to $C_8$ aldehyde), except n-butyraldehyde. In some embodiments, the aldehyde can include 8 or fewer carbon atoms per molecule, 6 or fewer carbon atoms per molecule, or 4 or fewer carbon atoms per molecule. In other embodiments, the aldehyde can have 1 or more carbon atoms per molecule, more than 1 carbon atoms per molecular, more than 2 carbon atoms per molecule, or more than 3 carbon atoms per molecule. In embodiments, the aldehyde will be commercially available and economically viable having a cost similar to or less than that of commercially available n-butyraldehyde.

The aldehyde other than n-butyraldehyde may be an aliphatic or an aromatic aldehyde and can be either a branched or a straight chain molecule. Examples of suitable aldehydes other than n-butyraldehyde can include, but are not limited to, formaldehyde, acetaldehyde, i-butyraldehyde, pivalaldehyde, propionaldehyde, 2-ethylhexyl aldehyde, hydroxy pivalaldehyde, benzaldehyde, and combinations thereof. In some embodiments, the aldehyde other than n-butyraldehyde can be selected from the group consisting of i-butyraldehyde, pivalaldehyde, and α-substituted aldehydes such as 2-methylbutyraldehyde, 2-methylhexaldehyde and the like, and combinations thereof, while, in some embodiments, the aldehyde other than n-butyraldehyde can be selected from the group consisting of i-butyraldehyde, pivalaldehyde, and combinations thereof.

According to various embodiments, the resin composition, layer, or interlayer may also include a poly(vinyl acetal) resin comprising residues of n-butyraldehyde. In some embodiments, these residues of n-butyraldehyde may be present in the same resin having residues of an aldehyde other than n-butyraldehyde, thereby forming a single "hybrid" resin with multiple aldehyde residues. In other embodiments, the n-butyraldehyde residues may be present on a second poly(vinyl acetal) resin physically blended with the first poly(vinyl acetal) resin that includes residues of an aldehyde other than n-butyraldehyde, and the blend can be present in the composition, layer, or interlayer. Typically, for every blend of resins, an equivalent single hybrid poly(vinyl acetal) resin also exists that may be substituted for the blend with similar results.

When the resin, composition, layer, or interlayer includes a single hybrid resin having residues of different aldehydes or a physical blend of a first poly(vinyl acetal) resin comprising residues of an aldehyde other than n-butyraldehyde and a second poly(vinyl acetal) resin comprising residues of n-butyraldehyde, the residues of the aldehyde other than n-butyraldehyde and the residues of n-butyraldehyde may each be present in the resin in an amount of at least about 1, at least about 2, at least about 3, at least about 4, at least about 5, at least about 10, at least about 15, at least about 20, at least about 25, at least about 30, at least about 35, at least about 40, or at least about 45 percent, based on the total weight of the aldehyde residues of the single resin. The combined amount of these two residues can comprise at least about 40, at least about 50, at least about 60, at least about 70, at least about 80, or at least about 90 percent of the total weight of the aldehyde residues of the resin. In embodiments, it is beneficial to have at least about 5 weight percent residues of an aldehyde in order for it to influence the particular properties. In some embodiments, the ratio, by weight, of residues of the n-butyraldehyde to the aldehyde other than n-butyraldehyde residues can be at least about 5:95, at least about 10:90, at least about 15:85, at least about 25:75, at least about 30:70, at least about 40:60 and/or not more than about 99:1, not more than about 95:5, not more than about 90:10, not more than about 85:15, not more than about 75:25, not more than about 70:30, not more than about 60:40, or in the range of from about 5:95 to about 95:5, about 10:90 to about 90:10, about 15:85 to about 85:15, about 25:75 to about 75:25, about 30:70 to about 70:30, or about 40:60 to about 60:40, or the residues of the aldehyde other than n-butyraldehyde can be present in the poly(vinyl acetal) resin in an amount of at least about 5, at least about 10, at least about 15, at least about 25, at least about 30, or at least about 40 weight percent, based on the combined weight of the residues of the aldehyde other than n-butyraldehyde and the residues of n-butyraldehyde.

In embodiments, branched aldehydes, such as those having methyl branching at the α-carbon, may be used. Branching at the α-carbon imparts in the polymer or interlayer a "high flow" attribute under extrusion or autoclave conditions when all other factors are kept constant. Stated differently, having an aldehyde with branching at the α-carbon provides an interlayer having improved flow properties.

Figure 3:
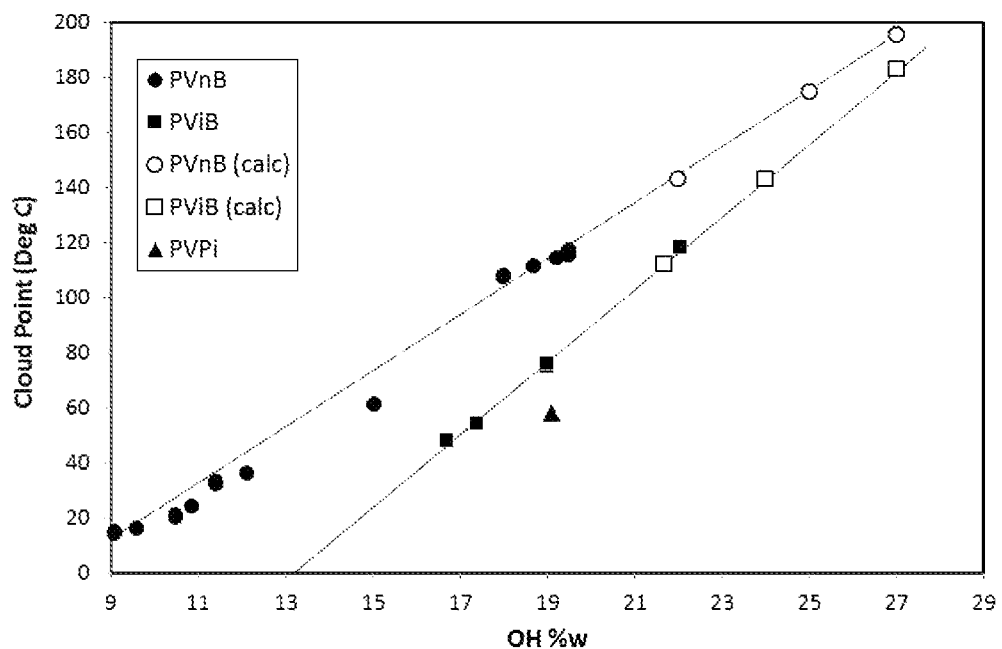
FIG. 3 is a graph depicting cloud point temperature in 3GEH plasticizer versus hydroxyl content of PVnB and PViB.

Poly(vinyl acetal) polymers produced using i-butyraldehyde tend to be less polar compared to a poly(vinyl acetal) polymer produced using n-butyraldehyde with the same residual hydroxyl level. The steric effects introduced by the branching at the α-carbon effectively mask the residual hydroxyl groups and reduce the polarity of the polymer. Increasing the branching at the α-carbon introduces further steric hindrance, and makes the polymer even less polar. For instance, a poly(vinyl acetal) polymer produced using pivalaldehyde has three methyl groups attached to the α-carbon, and has a cloud point temperature that is even lower than that of a poly(vinyl acetal) produced using i-butyraldehyde at the same residual hydroxyl level, as shown in FIG. 3. In addition, shorter side groups allow the polymer chains to get closer to each other forming a more tightly packed matrix. The net result is a resin or polymer that is less hydrophilic, more resistant to moisture and stiffer than the conventional poly(vinyl acetal) polymer made using n-butyraldehyde, and the resulting resin can be used in applications where higher stiffness is desired.

In embodiments, it may be beneficial to have a poly(vinyl acetal) resin that comprises aldehydes containing less than two α-hydrogens (such as i-butyraldehyde). For example, poly(vinyl acetal) resins made with i-butyraldehyde or other aldehydes containing less than two α-hydrogens have superior compatibility with a wide range of commonly used plasticizers compared to other poly(vinyl acetal) resins made with other aldehydes containing two or more α-hydrogens. These improved resins have high intrinsic stiffness yet superior melt flow compared to resins with two or more α-hydrogens, a combination of properties that are ideal for structural glazing applications that require interlayers with a glass transition temperature of more than 40° C. Additionally, these improved resins have higher moisture resistance and superior energy dissipation potential compared to more conventional poly(vinyl acetal) resins, such as those made from aldehydes such as n-butyraldehyde.

In addition to residues of one or more aldehydes, the poly(vinyl acetal) resins described herein may also include residual hydroxyl and/or residual acetate groups. As used herein, the terms "residual hydroxyl content" and "residual acetate content" refer to the amount of polyvinyl hydroxyl and polyvinyl acetate groups, respectively, that remain on a resin after processing is complete. For example, poly(vinyl acetal) can be produced by hydrolyzing poly(vinyl acetate) to poly(vinyl alcohol), and then acetalizing the poly(vinyl alcohol) with an aldehyde to form poly(vinyl acetal). In the process of hydrolyzing the poly(vinyl acetate), not all of the acetate groups are converted to hydroxyl groups, and residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl, PVOH, groups) and residual acetate groups (as vinyl acetate, PVAc, groups) as part of the polymer chain. The residual hydroxyl content and residual acetate content are expressed in weight percent, based on the weight of the polymer resin, and are measured according to ASTM D1396.

In various embodiments, one or more of the poly(vinyl acetal) resins present in a composition, layer, or interlayer may have a residual hydroxyl content of at least about 20, at least about 21, at least about 22, at least about 23, at least about 24, at least about 25, or at least about 26 and/or not more than about 45, not more than about 44, not more than about 43, not more than about 42, not more than about 41, not more than about 40, not more than about 39, not more than about 38, not more than about 37, not more than about 36, not more than about 35, not more than about 34, not more than about 33, not more than about 32, not more than about 31, or not more than about 30 weight percent, measured as described previously. In embodiments, one or more of the poly(vinyl acetal) resins present in a composition, layer, or interlayer may have a residual hydroxyl content of from about 21 to about 40, or about 23 to about 39 weight percent.

When two or more poly(vinyl acetal) resins are present in a resin composition, layer, or interlayer as described herein, one or more of the resins can have a residual hydroxyl content different from the residual hydroxyl content of one or more of the other resins. For example, when a resin composition, layer, or interlayer includes a first poly(vinyl acetal) resin and a second poly(vinyl acetal) resin, at least one of the resins can have a residual hydroxyl content that is at least 2 weight percent different than the other. As used herein, the terms "weight percent different" and "the difference . . . is at least . . . weight percent" refer to a difference between two given weight percentages, calculated by subtracting one number from the other number. For example, a poly(vinyl acetal) resin having a residual hydroxyl content of 12 weight percent and a poly(vinyl acetal) resin having a residual hydroxyl content of 14 weight percent have a weight percent difference of 2. As used herein, the term "different" encompasses values that are both higher and lower than another value.

According to some embodiments, the residual hydroxyl content of one poly(vinyl acetal) resin can be at least about 3, at least about 4, at least about 5, at least about 6, at least about 7, or at least about 8 weight percent higher or lower than the residual hydroxyl content of another. In some embodiments, the difference between the residual hydroxyl content of one of the poly(vinyl acetal) resins and the residual hydroxyl content of another of the poly(vinyl acetal) resins in the compositions, layers, and interlayers described herein can be at least about 10, at least about 12, at least about 15, at least about 20, or at least about 30 weight percent.

Poly(vinyl acetal) polymers with high residual hydroxyl content (for example, greater than 24 weight percent), and shorter acetyl pendant groups can help to provide stiffer resins and interlayers, and particularly polymers having very high residual hydroxyl levels of at least 24 weight percent or more. These polymers have higher intrinsic stiffness under ambient conditions and lower melt viscosity under extrusion or lamination conditions compared to poly(vinyl n-butyral) polymers containing the same percentage of residual hydroxyl groups and made from the same starting polyvinyl alcohol (PVOH) raw material. Interlayers that are able to maintain stiffness at elevated temperatures or under long load durations are particularly desirable in fenestration designs that demand superior post-glass breakage behavior. An interlayer with a higher modulus at 20° C., when used in certain types of laminates or glazings, such as hurricane glazings, can help reduce the laminate deflection in the cycling test component of the new hurricane performance standards.

Use of poly(vinyl acetal) resins with higher residual hydroxyl values (such as higher than about 18 to 20 weight percent often found in conventional resins) are useful in applications requiring structural performance due to their higher stiffness. For example, an interlayer containing poly (vinyl n-butyral) resin having about 27 weight percent residual hydroxyl level and about 20 phr plasticizer (such as triethylene glycol bis(2-ethylhexanoate) (3GEH)) has been shown to improve the glass transition temperature ("$T_g$") and storage modulus at 50° C. ("$G'_{50° C.}$") to about 51.6° C. and 6 MPa respectively compared to a conventional interlayer containing poly(vinyl n-butyral) resin with about 18.7 weight percent residual hydroxyl level and the same plasticizer which has $T_g$ and $G'_{50° C.}$ values of about 43° C. and 1 MPa respectively. ($T_g$ and $G'_{50° C.}$ are further defined below.) The first resin, having a high residual hydroxyl level (about 27 weight percent) cannot be easily blended with more conventional poly(vinyl n-butyral) resins containing lower residual hydroxyl levels (such as 18 to 20 weight percent) due to differences in plasticizer compatibilities of the two polymers, as previously described. A blend of these two resins having different residual hydroxyl content in an interlayer causes a laminate comprising the interlayer to look hazy, and this haze is believed to be caused by plasticizer partitioning within the interlayer due to the large residual hydroxyl level differences.

Poly(vinyl acetal) resins made with i-butyraldehyde (PViB resins) are known to possess superior stiffness at a given plasticizer loading compared to resins made with n-butyraldehyde. These PViB resins maintain this stiffness advantage when the residual hydroxyl levels are higher than the conventional levels, and the PViB resins are also more miscible with poly(vinyl n-butyral) resins having conventional residual hydroxyl levels (such as 18 to 20 weight percent), as further described below in the Examples. It is believed that these advantages are due to the lower polarity and higher compatibility of PViB resin with plasticizer (such as 3GEH) compared to PVnB resins (at the same residual hydroxyl level). This improved miscibility of the PViB resins means that PViB resins with high residual hydroxyl levels can be more readily blended with standard or conventional PVnB resins without resulting in an interlayer having high HLD haze, which results in a very hazy laminate comprising the interlayer.

Correlation between residual hydroxyl level and stiffness of a neat (unplasticized) polymer resin or a plasticized poly(vinyl n-butyral) polymer is well-known. Increasing residual hydroxyl content increases the hydrogen bonding between chains and leads to an increase in glass transition temperature of the polymer. This correlation can be used to advantage where ambient and high temperature rigidities are desired, such as in structural architectural applications. Increasing the residual hydroxyl content, however, also makes the polymer more polar and less compatible with plasticizers (such as 3GEH) traditionally used in many interlayer formulations. Having a more polar polymer tends to be more hydrophilic, and a plasticized sheet made from the more polar polymer has lower moisture resistance, lower edge stability, and is more prone to delamination along the edges. Also, a PVnB polymer with residual hydroxyl levels significantly higher than that of the standard or conventional resins (that is, around 18 to 20 weight percent) cannot be blended in high ratios without causing the resulting laminate to look cloudy or hazy, as previously described. Therefore, it would be desirable to have a polymer that can improve the stiffness of the interlayer to be used in structural applications while also maintaining its polarity as close to that of the conventional PVnB polymers as possible.

FIG. 3 shows measured and calculated cloud point temperatures of PVnB, PViB and PVPi resins in 3GEH plasticizer as functions of residual hydroxyl levels. From the cloud point temperature, polarity of a polymer relative to a plasticizer system can be estimated. For example, comparing two PVnB resins of different residual hydroxyl levels, as seen from FIG. 3, as the residual hydroxyl level decreases, the cloud point temperature also decreases. This suggests an increase in resin-plasticizer compatibility. Reducing residual hydroxyl level makes the PVnB polymer less polar, which reduces the difference in polarities of the resin and plasticizer and makes them more compatible with each other. Comparing PVnB and PViB resins having the same residual hydroxyl levels, as seen from FIG. 3, the PViB resin tends to have a cloud point temperature that is lower than that of the PVnB resin with the same residual hydroxyl content. For example, a PVnB with approximately 19 weight percent residual hydroxyl has a cloud point temperature of approximately 116° C., while a PViB having the same residual hydroxyl content has a cloud point temperature of only about 78° C. This shows that the polarity of PViB (at 19 weight percent residual hydroxyl) is lower than that of PVnB at the same level. It also shows that the polarity of the PViB (19 weight percent residual hydroxyl) is close to that of PVnB having a significantly lower residual hydroxyl level (about 15.4 weight percent). Thus cloud point measurements can help in determining relative polarities of different resin/plasticizer systems.

When there are two or more poly(vinyl acetal) resins having different aldehyde residues, the residual hydroxyl level of each resin may be the same or they may be different. Having two or more resins having different aldehyde residues facilitates blending of the resins to produce a composition that is not hazy or has low haze when used in a layer or interlayer. In general, two or more poly(vinyl acetal) resins with the same aldehyde residues cannot be blended together to produce a laminate with low haze if the residual hydroxyl levels of the two or more different resins are substantially different (such as greater than about 2 or 3 percent or more different), and the refractive index of the plasticizer does not match that of the resin. It has been discovered that two or more poly(vinyl acetal) resins with certain different aldehyde residues can be blended together to produce a laminate with low HLD haze when the residual hydroxyl levels of the two or more different resins are substantially different and the refractive index of the plasticizer does not match that of the resin.

In a laminate, HLD haze is caused by unequal distribution of plasticizer in the interlayer in the laminate, which causes molecular domains that are either richer or poorer in plasticizer concentration compared to the domains in the surrounding continuum. When the refractive index of the plasticizer is not similar to or does not match that of the resin, these domains refract light differently, which leads to a hazy appearance in the laminate. The unequal distribution of plasticizer, in turn, is caused by differences in compatibilities of different components in the resin blend with a given plasticizer. For example, a poly(vinyl n-butyral) resin with 19 weight percent residual hydroxyl level is more compatible with 3GEH plasticizer than is a poly(vinyl n-butyral) resin with 21.9 weight percent residual hydroxyl level. When the two resins are blended in 50:50 ratio, the plasticizer prefers to stay with (or partition to) the resin having the lower residual hydroxyl level, which creates the micro-domains within the interlayer and a laminate with high HLD haze. If the aldehyde residues of the resins are the same, the compatibilities of different components in a resin blend with a given plasticizer are almost exclusively determined by their residual hydroxyl contents. However, if the aldehyde residues are different, the compatibilities of the different components may change as the polarity of a polymer is not only influenced by its residual hydroxyl content but also by its specific aldehyde moieties. Therefore, it is possible to have blends resins having different aldehyde residues and substantially different hydroxyl levels values that have low HLD haze, as further described below.

When a resin composition, layer, or interlayer comprises two poly(vinyl acetal) resins having different residual acetate contents, the difference in residual acetate contents between two of the resins can be at least about at least about 2, at least about 4, at least about 6, at least about 8, at least about 10, at least about 12 and/or not more than about 30, not more than about 20, not more than about 15, or not more than about 10 weight percent, or the difference can be in the range of from about 2 to about 30, about 4 to about 20, about 6 to about 15, or about 8 to about 10 weight percent. For example, in some embodiments, at least one of the poly (vinyl acetal) resins described herein can have a residual acetate content of not more than about 4, not more than about 3, not more than about 2, or not more than about 1 weight percent, measured as described previously. In some embodiments, at least another of the poly(vinyl acetal) resins may have a residual acetate content of at least about 8, at least about 10, at least about 12, at least about 14, at least about 16, at least about 18, or at least about 20 weight percent.

In some embodiments, when the resin composition, layer, or interlayer includes a physical blend of resins, the first and second poly(vinyl acetal) resins may be blended such that one of the first and second poly(vinyl acetal) resins is dispersed within the other of the first and second poly(vinyl acetal) resins, which can form domains of one of the first and second poly(vinyl acetal) resins within the other of the first and second poly(vinyl acetal) resins. Such a blended resin may be used as a single layer interlayer or it may be combined with one or more adjacent layers to form a multilayer interlayer. In other embodiments, the first and second poly(vinyl acetal) resins can be present in adjacent layers of a multilayer interlayer, such that one of the layers of the interlayer includes the first poly(vinyl acetal) resin and another layer of the interlayer includes the second poly(vinyl acetal) resin. Additional layers can also be present adjacent to at least one of the layers.

The resin compositions, layers, and interlayers according to various embodiments of the present invention can further include at least one plasticizer. Depending on the specific composition of the resin or resins in a composition, layer, or interlayer, the plasticizer may be present in an amount of at least about 1, at least about 2, at least about 3, at least about 4, at least about 5, at least about 10, at least about 15, at least about 20, at least about 25, at least about 30 or more parts per hundred parts of resin (phr) and/or not more than about 50, not more than about 45, or not more than about 40 phr, or in the range of from about 1 to about 50, about 5 to about 40, about 10 to about 35, or about 15 to about 30 phr, although different amounts may be selected depending on the desired properties and applications.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the resin composition, layer, or interlayer includes two or more resins, the weight of plasticizer is compared to the combined amount of the resins present to determine the parts per hundred resin. Further, when the plasticizer content of a layer or interlayer is provided herein, it is provided with reference to the amount of plasticizer in the mix or melt that was used to produce the layer or interlayer.

Examples of suitable plasticizers can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), polyethylene glycol bis(2-ethylhexanoate), dipropylene glycol dibenzoate, dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate), tetraethylene glycol di-(2-ethylhexanoate), and combinations thereof. In some embodiments, at least two plasticizers may be present in the compositions, layers, and interlayers described herein, with one of the plasticizers enhancing the compatibility of one or more other plasticizers in the composition.

Suitable plasticizers also include high refractive index plasticizers ("high RI plasticizer"). As used herein, the term "high RI plasticizer," refers to a plasticizer having a refractive index of at least 1.460, measured as described previously. The high RI plasticizers suitable for use can have a refractive index of at least about 1.470, at least about 1.480, at least about 1.490, at least about 1.500, at least about 1.510, at least about 1.520 and/or not more than about 1.600, not more than about 1.575, or not more than about 1.550, measured as discussed above. The refractive index of the high RI plasticizers may be in the range of from about 1.460 to about 1.600, about 1.470 to about 1.575, about 1.480 to about 1.550, about 1.490 to about 1.525.

Examples of types or classes of high RI plasticizers can include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates and toluates (RI of about 1.480 to about 1.550); and other specialty plasticizers (RI of about 1.490 to about 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexanoate), di-(butoxyethyl) terephthalate, di-(butoxyethyoxyethyl) terephthalate, and mixtures thereof. The high RI plasticizer may be selected from dipropylene glycol dibenzoate and tripropylene glycol dibenzoate, and/or 2,2,4-trimethyl-1,3-pentanediol dibenzoate.

When the resin, composition, layer or interlayer includes a high RI plasticizer, the plasticizer can be present in the layer alone or it can be blended with one or more additional plasticizers. The other plasticizer or plasticizers may also comprise high RI plasticizers, or one or more may be a lower RI plasticizer having a refractive index of less than 1.460. In some embodiments, the lower RI plasticizer may have a refractive index of less than about 1.450, less than about 1.445, or less than about 1.442 and can be selected from the group listed previously. When a mixture of two or more plasticizers are employed, the mixture can have a refractive index within one or more of the above ranges.

One or more resin compositions, layers, and interlayers described herein may include various other additives to impart particular properties or features to the interlayer. Such additives can include, but are not limited to, adhesion control agents ("ACAs"), dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers.

When two or more poly(vinyl acetal) resins are utilized in a resin composition, layer, or interlayer, and at least one of the resins has a residual hydroxyl and/or acetate content different from one or more other resins, the differences may be selected to control or provide certain performance properties, such as strength, impact resistance, penetration resistance, processability, or acoustic performance to the final composition, layer, or interlayer. For example, poly(vinyl acetal) resins having a higher residual hydroxyl content, such as greater than about 14 weight percent, can facilitate increased impact resistance, penetration resistance, and strength to a resin composition or layer, while lower hydroxyl content resins, such as having a residual hydroxyl content of less than 13 weight percent, can improve the acoustic performance of the interlayer or blend.

Poly(vinyl acetal) resins having higher or lower residual hydroxyl contents and/or residual acetate contents, when combined with at least one plasticizer, ultimately include different amounts of plasticizer. As a result, different layers within a multilayered interlayer, for example, may have different properties. Although not wishing to be bound by theory, it is understood that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. Depending on the specific resin and plasticizer, however, these trends could be reversed.

When two poly(vinyl acetal) resins having different levels of residual hydroxyl content are blended with a plasticizer, the plasticizer may partition between the resin layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins.

In some embodiments, when the resin layer or interlayer includes at least a first resin layer comprising a first poly(vinyl acetal) resin and a first plasticizer, and a second resin layer, adjacent to the first resin layer, comprising a second poly(vinyl acetal) resin and a second plasticizer, the resin layers may have different plasticizer contents. For example, the difference in plasticizer content between the resin layers can be at least about 2, at least about 5, at least about 8, at least about 10, at least about 12, or at least about 15 phr or more.

In some embodiments, when there are multiple layers, the first and second resin layers can exhibit different glass transition temperatures. Glass transition temperature, or $T_g$, is the temperature that marks the transition from the glass state of the polymer to the rubbery state. The glass transition temperatures of the resins and layers described herein were determined by dynamic mechanical thermal analysis (DMTA). The DMTA measures the storage (elastic) modulus (G') in Pascals, loss (viscous) modulus (G") in Pascals, and the tan delta (G"/G') of the specimen as a function of temperature at a given frequency and temperature sweep rate. The glass transition temperature was then determined by the position of the tan delta peak on the temperature scale. Glass transition temperatures provided herein were determined at a frequency of 1 Hz and a sweep rate of 3° C./min.

The difference in the glass transition temperature of a first resin layer and the glass transition temperature of a second resin layer can be at least about 2, at least about 3, at least about 4, at least about 5, at least about 8, at least about 10, at least about 12, at least about 15, at least about 18, at least about 20, at least about 22, or at least about 25° C. or more. One of the first and second resin layers can have a glass transition temperature of at least about 28, at least about 29, at least about 30, at least about 33, at least about 35, at least about 37° C. and/or not more than about 45, not more than about 40, not more than about 35, not more than about 30, not more than about 28° C., or in the range of from about 28 to about 50, about 29 to about 48, about 30 to about 45° C. The other of the first and second poly(vinyl acetal) resin layers can have a glass transition temperature at least about 30, at least about 32, at least about 34, at least about 36, at least about 38, at least about 40 or more and not more than about 110, not more than about 95, not more than about 90, not more than about 80, or not more than about 70° C., or in the range of from about 30 to about 110, about 35 to about 100, about 40 to about 80° C.

As previously stated, according to various embodiments of the present invention, resin compositions, layers, and interlayers as described herein that include at least one poly(vinyl acetal) resin having residues of an aldehyde other than n-butyraldehyde as described herein may exhibit different properties, such as, for example, glass transition temperature, refractive index, and tan delta, as compared to similar resin compositions, layers, and interlayers formed using conventional poly(vinyl n-butyral) resins.

For example, in some embodiments, poly(vinyl acetal) resins including residues of aldehydes other than n-butyraldehyde may have a different molecular weight than a comparable poly(vinyl n-butyral) resin. As used herein, the term "comparable poly(vinyl n-butyral) resin" refers to a poly(vinyl acetal) resin having the same residual acetal, residual hydroxyl, and acetate content as a given poly(vinyl acetal) resin, but that includes an acetal component including only residues of n-butyraldehyde. In various embodiments, the poly(vinyl acetal) resin that includes residues of an aldehyde other than n-butyraldehyde can have a molecular weight that is at least about 5, at least about 10, at least about 15, or at least about 20 percent higher or lower than the molecular weight of a comparable poly(vinyl n-butyral) resin, depending on the aldehyde type.

In some embodiments, the molecular weight of the poly(vinyl acetal) resin including residues of an aldehyde other than n-butyraldehyde can be higher, lower or about the same as a comparable poly(vinyl n-butyral) resin. When referring to the molecular weight and comparing molecular weights of resins having different aldehydes, it is assumed that all other factors such as molecular weight of starting PVOH and degree of conversion on molar basis are kept constant. The molecular weight of the particular resin depends on that of the aldehyde residues in the resin. If the aldehyde(s) chosen has a lower molecular weight than n-butyraldehyde, then the corresponding resin will also have a lower molecular weight than poly(vinyl n-butyral) and vice versa. The molecular weight of poly(vinyl acetal) resins comprising residues of an aldehyde other than n-butyraldehyde may be at least about 10,000, at least about 15,000, at least about 20,000, at least about 25,000 and/or not more than about 250,000, not more than about 200,000, not more than about 150,000, not more than about 100,000, or not more than about, or less than about, 50,000 Daltons, or in the range of from about 10,000 to about 250,000, about 15,000 to about 200,000, about 20,000 to about 150,000, or about 25,000 to about 50,000 Daltons. In contrast, a poly(vinyl n-butyral) (PVnB) resin may have a molecular weight of at least about 50,000, at least about 70,000, at least about 80,000, at least about 90,000, at least about 100,000 Daltons and/or not more than about 600,000, not more than about 550,000, not more than about 500,000, not more than about 450,000, not more than about 425,000, or not more than about 325,000 Daltons, measured by size exclusion chromatography using low angle laser light scattering (SEC/LALLS) method of Cotts and Ouano. As used herein, the term "molecular weight" refers to the weight average molecular weight ($M_w$). Other molecular weight values may be appropriate depending on the desired properties of the resin composition, layer or interlayer.

In some embodiments, poly(vinyl acetal) resin having residues of an aldehyde other than n-butyraldehyde can have higher compatibility with a plasticizer than a comparable poly(vinyl n-butyral) resin. Higher compatibility of a poly(vinyl acetal) resin in a given plasticizer can be measured as the cloud point of the resin in that plasticizer. As used herein, the term "cloud point" refers to the temperature at which a dissolved solid is no longer completely soluble in a liquid. Cloud point is measured by mixing 0.05 grams of resin with 1.95 grams of a plasticizer at room temperature and then heating the mixture in a silicone oil bath under continuous stirring conditions until the resin is completely dissolved and the solution is clear. The heating is then stopped and the temperature continuously monitored. The temperature at which the solution begins to cloud, which indicates precipitation of solid resin from the solution, is referred to as the cloud point temperature.

In some embodiments, poly(vinyl acetal) resins that include residues of an aldehyde other than n-butyraldehyde can have a lower cloud point than a comparable poly(vinyl n-butyral) resin in one or more plasticizers. For these plasticizers, this indicates higher compatibility with the plasticizer than a comparable poly(vinyl n-butyral) resin. In some embodiments, the poly(vinyl acetal) resin comprising residues of an aldehyde other than n-butyraldehyde can have a cloud point temperature that is at least about 1, at least about 2, at least about 3, at least about 4, at least about 5, or at least about 10° C. lower than the cloud point temperature of a comparable poly(vinyl n-butyral) resin in a given plasticizer. The plasticizer can be one or more of those listed above, or any other suitable plasticizer.

Additionally, poly(vinyl acetal) resins comprising residues of an aldehyde other than n-butyraldehyde may have a lower solution viscosity than a comparable poly(vinyl n-butyral) resin. For example, in some embodiments, the viscosity of a poly(vinyl acetal) resin comprising residues of an aldehyde other than n-butyraldehyde can be at least about 5, at least about 10, at least about 15, or at least about 20 percent lower than the viscosity of a comparable poly(vinyl n-butyral) resin. The molecular weight of the starting PVOH and the residual hydroxyl level of the resin has an impact on the viscosity. In addition, side groups, such as isobutyral side groups, reduce the solution viscosity significantly. As used herein, solution viscosity was measured using a Cannon Fenske capillary viscometer size 400, commercially available from Cannon Instrument Company, State College, Pa., at 20° C. in a 7.5 percent methanol solution. Once the solution has been prepared, the solution is allowed to equilibrate in a 20° C.±0.1° C. water bath for at least 30 minutes. The viscometer is placed in the water bath and 10 mL of the solution is transferred to the viscometer using a fast flow pipette by pressing the fluid with a pressure bulb to beyond the upper mark of the viscometer, and recording the time taken by the liquid level to pass between the upper and lower marks. The viscosity of a poly(vinyl acetal) resin comprising residues of an aldehyde other than n-butyraldehyde can be at least about 5, at least about 10, at least about 15, at least about 20, or at least about 30 centipoise (cps) lower than the viscosity of a comparable poly(vinyl n-butyral) resin.

Additionally, a poly(vinyl acetal) resin comprising residues of an aldehyde other than n-butyraldehyde may also have a glass transition temperature that is different than the glass transition temperature of a comparable poly(vinyl butyral) resin. For example, the glass transition temperature of the poly(vinyl acetal) resin including residues of an aldehyde other than n-butyraldehyde can be at least about 5, at least about 10, at least about 15, at least about 20, or at least about 25 percent higher or lower than the glass transition temperature of a comparable poly(vinyl n-butyral) resin. The glass transition temperature of the poly(vinyl acetal) resin comprising residues of an aldehyde other than n-butyraldehyde can be at least about 2, at least about 3, at least about 4, at least about 5, at least about 6, at least about 7, at least about 8, at least about 9, at least about 10, at least about 11, or at least about 12° C. (or more) higher or lower than the glass transition temperature of a comparable poly (vinyl n-butyral) resin.

In some embodiments, the poly(vinyl acetal) resin including residues of an aldehyde other than n-butyraldehyde may have a glass transition temperature that is very high, and while there is no upper limit, in embodiments, the glass transition temperature may be not more than about 120, not more than about 110, not more than about 100, not more than about 95, not more than about 90, not more than about 85, not more than about 80, or not more than about 75° C., while in other embodiments, the glass transition temperature of the poly(vinyl acetal) resin comprising residues of an aldehyde other than n-butyraldehyde can be at least about 40, at least about 45, at least about 50, at least about 55, at least about 60, at least about 65, at least about 70, or at least about 75° C. or more, measured as described previously. When two or more poly(vinyl acetal) resins are present in a composition, layer, or interlayer, the difference in glass transition temperature between one of the resins and at least one or more other resins can be at least about 2, at least about 3, at least about 4, at least about 5, at least about 8, at least about 10, or at least about 15° C. or more, depending on the properties desired.

In some embodiments, the resin layer or interlayer including at least one poly(vinyl acetal) resin having residues of an aldehyde other than n-butyraldehyde may also exhibit enhanced acoustic properties, such as, for example, an improved tan delta as compared to a comparable poly(vinyl n-butyral) resin layer. In some embodiments, the tan delta of the resin layer including at least one poly(vinyl acetal) resin having residues of an aldehyde other than n-butyraldehyde can be at least about 1, at least about 2, at least about 3, at least about 4, at least about 5, at least about 10, at least about 15, or at least about 20 percent higher than the tan delta of a comparable poly(vinyl n-butyral) resin. The tan delta of the resin layer comprising the poly(vinyl acetal) resin including residues of an aldehyde other than n-butyraldehyde can be at least about 0.70, at least about 0.75, at least about 0.80, at least about 0.85, at least about 0.90, at least about 0.95, at least about 1.00, at least about 1.05, at least about 1.10, at least about 1.15, at least about 1.20, at least about 1.25, at least about 1.30, at least about 1.35, or at least about 1.40, measured as described previously.

Further, poly(vinyl acetal) resins comprising residues of an aldehyde other than n-butyraldehyde may also have a refractive index different than a comparable poly(vinyl n-butyral) resin. Refractive index can be measured according to ASTM D542 at a wavelength of 589 nm and 25° C. In embodiments, the refractive index of a poly(vinyl acetal) resin comprising residues of an aldehyde other than n-butyraldehyde can be at least about 0.001, at least about 0.002, at least about 0.003, at least about 0.004, at least about 0.005 and/or not more than about 0.010, not more than about 0.007, or not more than about 0.006 higher or lower than the refractive index of a comparable poly(vinyl butyral) resin, or the difference can be in the range of from about 0.001 to about 0.010, about 0.002 to about 0.007, or about 0.003 to about 0.006. In some embodiments, the refractive index of the poly(vinyl acetal) resin comprising residues of an aldehyde other than n-butyraldehyde can be at least about 1.480, at least about 1.481, at least about 1.482, at least about 1.483, or at least about 1.484 or more. In some embodiments, the refractive index of the poly(vinyl acetal) resin including residues of an aldehyde other than n-butyraldehyde can be not more than about 1.490, not more than about 1.489, not more than about 1.488, not more than about 1.487, not more than about 1.486, not more than about 1.485, not more than about 1.484, not more than about 1.483, not more than about 1.482, not more than about 1.481, or not more than about 1.480. The refractive index of the poly(vinyl acetal) resin comprising residues of an aldehyde other than n-butyraldehyde can be in the range of from about 1.480 to about 1.490, about 1.482 to about 1.489, or about 1.483 to about 1.488.

As discussed previously, poly(vinyl acetal) resins comprising residues of an aldehyde other than n-butyraldehyde may, in some embodiments, be physically mixed with a poly(vinyl n-butyral) resin or may further include resins of n-butyraldehyde. Such combinations, which include a first poly(vinyl acetal) resin component and a second poly(vinyl acetal) resin component, may also exhibit unexpected properties, including glass transition temperature, viscosity, refractive index, and others. As used herein, the term "poly(vinyl acetal) resin component," refers either to an individual poly(vinyl acetal) resin present in a blend of resins or to an acetal moiety present on a single poly(vinyl acetal) resin. In some embodiments of the present invention, a blend of first and second poly(vinyl acetal) resin components may not only exhibit properties different than each individual component, but may also exhibit properties unexpected for the combination.

When a resin layer or interlayer includes at least one poly(vinyl acetal) resin including residues of an aldehyde other than n-butyraldehyde, the layer or interlayer may also exhibit unexpected or enhanced properties, as compared to a comparable resin layer formed from a poly(vinyl n-butyral) resin and a plasticizer of the same type and in the same amount. As used herein, the term "comparable poly(vinyl n-butyral) resin layer," refers to a resin layer formed using a comparable poly(vinyl n-butyral) resin, as defined previously, and a plasticizer of the same type and in the same amount as a given layer.

A resin layer that includes at least one poly(vinyl acetal) resin having residues of an aldehyde other than n-butyraldehyde can have a different glass transition temperature than a comparable poly(vinyl n-butyral) resin layer. For example, in various embodiments, the glass transition temperature of a resin layer including a poly(vinyl acetal) resin having residues of an aldehyde other than n-butyraldehyde can be at least about 0.25, at least about 0.50, at least about 1, at least about 1.5, at least about 2, at least about 3, at least about 4, or at least about 5° C. higher or lower than the glass transition temperature of a comparable poly(vinyl n-butyral) resin layer. In some embodiments, the glass transition temperature of the resin layer that comprises a poly(vinyl acetal) resin having residues of an aldehyde other than n-butyraldehyde can be at least about 25, at least about 30, at least about 35, or at least about 37° C., while, in some embodiments, it may be less than about 25, not more than about 20, not more than about 15, not more than about 10, not more than about 5, not more than about 2, not more than about 1, not more than about 0, not more than about −1, not more than about −2° C., measured as described previously.

According to some embodiments of the present invention, the resin layer may have a high glass transition temperature, such as, for example a glass transition temperature of greater than about 40, greater than about 42, greater than about 44, greater than about 46, greater than about 48, or greater than about 50° C. or more. Such a resin layer, which may also be used as a single-layer interlayer or may be combined with one or more other layers to form a dual-layer interlayer or a multilayer interlayer comprising three or more layers, may be used in applications requiring high levels of impact resistance or strength. In various embodiments, such an interlayer may be formed by combining at least one poly(vinyl acetal) resin comprising at least 10 weight percent of residues of an aldehyde other than n-butyraldehyde and a plasticizer. The plasticizer may be present in the composition in an amount to provide the resin layer with a glass transition temperature greater than 40° C., such as, for example, an amount of at least about 1, at least about 2, at least about 5 phr and/or not more than about 30, not more than about 25, not more than about 20 phr, not more than about 15 phr, or not more than about 10 phr, or an amount in the range of from about 1 to about 30, about 2 to about 25, about 5 to about 15, about 5 to about 30, or about 5 to about 20 phr. The glass transition temperature of the layer or interlayer can be at least about 30, at least about 31, at least about 32, at least about 33, at least about 35, at least about 37, at least about 40, at least about 42, at least about 44, at least about 46, at least about 48, at least about 50, at least about 52, at least about 54, at least about 55, at least about 60, at least about 65, or at least about 70° C. or more. One skilled in the art will select the appropriate glass transition temperature(s) based on the desired properties and application.

The resins or blended resins can be formed into one or more resin layers according to any suitable method. Exemplary methods of forming polymer layers and interlayers can include, but are not limited to, solution casting, compression molding, injection molding, melt extrusion, melt blowing, and combinations thereof. Multilayer interlayers including two or more resin layers may also be produced according to any suitable method such as, for example, co-extrusion, blown film, melt blowing, dip coating, solution coating, blade, paddle, air-knife, printing, powder coating, spray coating, and combinations thereof. In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device. Other additives, such as ACAs, colorants, and UV inhibitors, which can be in liquid, powder, or pellet form, may also be used and may be mixed into the thermoplastic polymers or plasticizers prior to entering the extrusion device. These additives can be incorporated into the polymer resin and, by extension, the resultant polymer sheet, thereby enhancing certain properties of the polymer layer or interlayer and its performance in the final multiple layer glass panel or other end product.

In various embodiments, the thickness, or gauge, of any of the layers or interlayers can be at least about 2, at least about 5, at least about 10, at least about 15, at least about 20 mils and/or not more than about 120, not more than about 100, not more than about 90, not more than about 60, not more than about 50, or not more than about 35 mils, or it can be in the range of from about 2 to about 120, about 10 to about 100, about 15 to about 60, or about 20 to about 35 mils, although other thicknesses may be appropriate depending on the desired properties and/or application. In millimeters, the thickness of the polymer layers or interlayers can be at least about 0.05, at least about 0.13, at least about 0.25, at least about 0.38, at least about 0.51 mm and/or not more than about 2.74, not more than about 2.54, not more than about 2.29, not more than about 1.52, or not more than about 0.89 mm, or in the range of from about 0.05 to 2.74, about 0.25 to about 2.54 mm, about 0.38 to about 1.52 mm, or about 0.51 to about 0.89 mm, although other thicknesses may be appropriate depending on the desired properties and/or application.

In some embodiments, the resin layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other. When the interlayer is a multilayer interlayer, at least one, at least two, or at least three of the layers of the interlayer can be wedge-shaped. When the interlayer is a monolithic interlayer, the polymer sheet can be flat or wedge-shaped. Wedge-shaped interlayers may be useful in, for example, heads-up-display (HUD) panels in automotive and aircraft applications.

The resin compositions, layers, and interlayers according to embodiments of the present invention may be utilized in a multiple layer panel that comprises a resin layer or interlayer and at least one rigid substrate. The rigid substrate(s) may be any rigid substrate, and in embodiments, may be a transparent substrate(s). Any suitable rigid substrate may be used and in some embodiments may be selected from the group consisting of glass, polycarbonate, biaxially oriented PET, copolyesters, acrylic, and combinations thereof. In some embodiments, when the rigid substrate(s) is a glass substrate, it may be selected from the group consisting of flat glass, float glass, warped glass, wavy glass, tempered glass, heat-strengthened glass, bent glass, chemically tempered glass, and combinations thereof. When the rigid substrate includes a polymeric material, the polymeric material may or may not include a hard coat surface layer as desired. In some embodiments, the multilayer panels include a pair of rigid substrates with the interlayer(s) disposed therebetween. The panels can be used for a variety of end use applications, including, for example, for automotive windshields and windows, aircraft windshields and windows, panels for various transportation applications such as marine applications, rail applications, etc., structural architectural panels such as windows, doors, stairs, walkways, balusters, ballustrades, decorative architectural panels, weather-resistant panels, such as hurricane glass or tornado glass, ballistic panels, and other similar applications.

When laminating the resin layers or interlayers between two rigid substrates, such as glass, the process can include at least the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time (such as at a temperature of about 60° C. to about 120° C.) to give the assembly enough temporary adhesion to seal the edge of the interlayer; (5) passing the assembly into a second pressure nip roll to further seal the edge of the interlayer and allow further handling; and (6) autoclaving the assembly (such as at a temperature between 135° C. and 150° C. and pressures between 150 psig and 200 psig for about 30 to 90 minutes or other conditions as appropriate and known to one of skill in the art). Other methods for de-airing the interlayer-glass interface, as described according to some embodiments in steps (2) through (5) above include vacuum bag and vacuum ring processes, and both may also be used to form interlayers of the present invention as described herein.

According to some embodiments wherein the resin compositions and layers described previously are used to form interlayers, the interlayers may also exhibit one or more improved or enhanced properties. The interlayers can comprise single, or monolithic, interlayers, or interlayers having at least a pair of adjacent resin layers. In some embodiments, the interlayers can include three or more resin layers with at least a first, second, and third resin layer, with the second resin layer sandwiched between the first and third. When the interlayer includes two or more resin layers, adjacent resin layers can comprise different poly(vinyl acetal) resins, and can have one or more properties that differ from each other. In some embodiments, the poly(vinyl acetal) resins present in adjacent layers may have different residual hydroxyl and/or acetal contents that differ from each other by an amount within the ranges provided above, and may comprise the same or different aldehyde residues.

In some embodiments, adjacent resin layers may have more than one and/or different glass transition temperatures, such as, for example, glass transition temperatures that differ from one another with the individual glass transition temperatures as previously described. In embodiments, the difference between the refractive index of the adjacent layers may be minimized by, for example, utilizing at least one poly(vinyl acetal) resin comprising residues of an aldehyde other than n-butyraldehyde. For example, in some embodiments, the absolute value of the difference between refractive indices between adjacent resin layers, of which at least one includes a poly(vinyl acetal) resin comprising residues of an aldehyde other than n-butyraldehyde, can be not more than about 0.010. In some embodiments, the absolute value of the difference in the refractive indices between such layers can be not more than about 0.009, not more than about 0.008, not more than about 0.007, not more than about 0.006, not more than about 0.005, not more than about 0.004, not more than about 0.003, or not more than about 0.002.

Interlayers according to various embodiments of the present invention exhibit optimized or enhanced optical properties. Clarity is one parameter used to describe the optical performance of blends or compositions, layers, and interlayers described herein and may be determined by measuring haze value or percent. Haze value represents the quantification of light scattered by a sample in contrast to the incident light. In some embodiments, the resin blends, layers, and interlayers described herein may have a haze value of less than 5 percent, less than about 4 percent, less than about 3 percent, less than about 2 percent, less than about 1, or less than about 0.5 percent, as measured in accordance with ASTM D1003-61 (reapproved 1977)—Procedure A using Illuminant C, at an observer angle of 2 degrees. The test is performed with a hazemeter, such as a Model D25 Hazemeter commercially available from Hunter Associates (Reston, Va.), on a polymer sample which has been laminated between two sheets of clear glass, each having a thickness of 2.3 mm (commercially available from Pittsburgh Glass Works of Pennsylvania).

HLD haze is measured by a HLD haze measurement apparatus, which is constructed with a tungsten halogen light source, a sample holder, a goniometer with a light detector mounted on. The HLD haze measurement apparatus is calibrated using a set of HLD standard laminates having a total thickness of 8.3 mm (5 layers of 0.76 mm interlayer) between two 2.3-mm clear glass sheets representing HLD Haze grades 0, 1, 2, and the like, with increasing values indicating increased HLD haze. In this measurement, laminate was made with clear glass having thickness of about 2.3 mm by normal autoclave lamination process. After the autoclave, the laminate was placed at room temperature overnight. The scatted light intensity at a scatted angle of 45° is collected from a testing laminate sample at room temperature using the HLD haze measurement apparatus, and HLD haze is calculated using a computer software and reported at a nominal total laminate thickness.

In some embodiments, the resin blends, layers, and interlayers described herein may have an HLD value of less than 1, less than about 0.9, less than about 0.8, less than about 0.7, less than about 0.6, or less than about 0.5.

The following examples are intended to be illustrative of the present invention in order to teach one of ordinary skill in the art to make and use the invention and are not intended to limit the scope of the invention in any way.

EXAMPLES

The following Examples describe the preparation of several resin compositions, layers, and interlayers that include various poly(vinyl acetal) resins having different aldehyde residues. As described below, several tests performed on many of the compositions, layers, and interlayers were used to evaluate the several properties of both comparative and inventive materials.

Example 1

Several pure and mixed poly(vinyl acetal) resins were made using conventional lab techniques using 5 L or 12 L glass or high pressure Parr reactors. Poly(vinyl alcohol) solution was prepared by dispersing the poly(vinyl alcohol) powder of the required molecular weight and molecular weight in water at ambient temperature followed by heating the slurry up to greater than 90° C. The poly(vinyl alcohol) is commercially available as a fine white powder from various suppliers, or alternatively it may be produced for captive consumption upstream in the process via hydrolysis of poly(vinyl acetate). The solution formed was initially held at the elevated temperature for a minimum of 30 minutes to ensure complete dissolution of all poly(vinyl alcohol) particles. The aldehyde (n-butyraldehyde, i-butyraldehyde or pivalaldehyde (also referred to as 2,2-dimethylpropanal and trimethylacetaldehyde)) was charged at the desired ratio along with a catalyst. Upon addition of the aldehyde and the catalyst, poly(vinyl acetal) polymer precipitated out within a few minutes. After completion of the reaction, the poly (vinyl acetal) particles were washed with copious amounts of demineralized water to remove unreacted aldehyde and the acid catalyst. A small quantity of a strong base (such as sodium or potassium hydroxide) was added to neutralize any remaining acid. At the end of the washing step, the slurry was filtered and the resin was dried in a lab fluidized bed dryer.

Each of the resins could alternatively be produced via a solvent route. Although many choices exist, a preferred solvent can be a lower alcohol such as methanol or ethanol. The reaction is initiated by dispersing poly(vinyl alcohol) of the desired molecular weight and molecular weight in the solvent. The aldehyde of choice and a catalyst are charged to the jacketed reactor fitted with an agitator and a condenser. The reaction mixture is heated to reflux temperature, and held at that temperature to finish conversion. Poly(vinyl acetal) polymer remains in solution. It is subsequently precipitated out by adding the solution to demineralized water under intense agitation. Precipitated polyvinyl acetal particles are washed, dried, and sifted as previously described.

The percent residual hydroxyl content and solution viscosity of the resins produced were measured and the results are provided in Table 1, below.

TABLE 1

Properties of Several Poly(vinyl acetal) Resins

| Resin | Aldehyde | PVOH (wt %) | Solution Viscosity (cps) (*) | Tg (° C.) | Cloud Point (° C. in 3GEH) |
|---|---|---|---|---|---|
| R-1 | n-butyraldehyde | 18.7 | 170 | 78.8 | 112.7 |
| R-2 | i-butyraldehyde | 18.9 | 110 | 88.7 | 78 |
| R-3 | pivalaldehyde | 19.1 | 80 | 102.5 | 58 |

(*) 7.5 wt. % solution in methanol at 20° C.

The resins were used to produce interlayer sheet samples as follows. To each resin, 38 phr of 3GEH plasticizer (and other standard additives) was added. The plasticized resins were extruded on a 1¼" Killion lab extruder to form interlayer sheet samples having a thickness of approximately 30 mils (0.76 mm). The sheet samples were conditioned under standard moisture conditions, and were laminated using 2.3 mm clear glass in the desired dimensions (using standard nip roll and autoclave procedures).

FIG. 1 provides a graphical representation of the complex viscosities ($|\eta^*|$) of the interlayers made from resins R-1 (PVnB), R-2 (PViB) and R-3 (PVPi) shown in Table 1 (with 38 phr 3GEH plasticizer) as functions of angular frequency ($\omega$). Resins R-1, R-2 and R-3 were all prepared by reacting the same raw material poly(vinyl alcohol), and all three had approximately the same residual hydroxyl level on a molar basis. Consequently, molecular weights of PVnB and PViB polymers were approximately the same, whereas that of PVPi was proportionately higher (because of the bulkier 2,2-dimethyl propyl pendant group compared to n-butyl or iso-butyl pendant groups). As seen from FIG. 1, the complex viscosity of PViB was consistently lower than that of PVnB over the entire range of angular frequencies in spite of the same molecular weight and residual hydroxyl levels of the two resins R-1 and R-2. The same observation can be made between PVnB and PVPi (resins R-1 and R-3) in spite of the fact that the PVPi has higher molecular weight compared to PVnB. Comparing PViB and PVPi, the viscosity of the PVPi is slightly higher than that of the PViB when the angular frequency is between 0.1 and 1 rad/s. Beyond 1 rad/s, the complex viscosity of PVPi is lower than that of PViB. These results clearly show the effect of methyl branching at the α-carbon on complex viscosity under extrusion or autoclave conditions. Methyl branching at the α-carbon imparts in the polymer a "high flow" attribute under extrusion or autoclave conditions when all other factors are kept constant.

Figure 2:
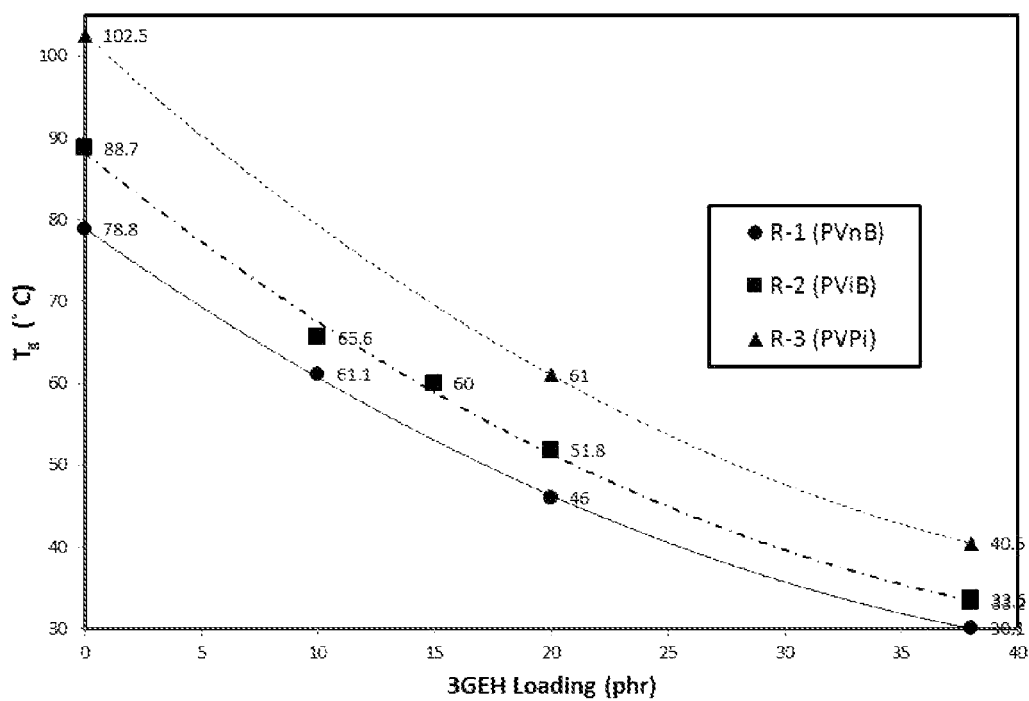
FIG. 2 is a graph depicting the glass transition temperature ($T_g$) as a function of 3GEH plasticizer loading for PVnB, PViB and PVPi.

FIG. 2 shows the $T_g$ as a function of plasticizer loading for interlayers made with resins R-1 (PVnB), R-2 (PViB) and R-3 (PVPi). Note that resin R-2 has a slightly higher stiffness than R-1. As shown by FIG. 2, the interlayer sheet containing plasticized resin R-3 (PVPi) has even higher stiffness over the entire range of plasticizer loadings compared to interlayer sheets made from plasticized resins R-2 (containing PViB) and R-1 (containing PVnB). At 38 phr plasticizer loading, the glass transition temperature of the interlayer sheet made from resin R-3 is approximately 6° C. higher than that of the sheet made from plasticized resin R-2, and it is approximately 10° C. higher than the sheet made from plasticized resin R-1. At lower plasticizer loadings (or as plasticizer content is reduced), the difference in glass transition temperature increases. As shown in Table 1, for the neat (unplasticized) polymer resins R-1, R-2 and R-3, the Tg of resin R-3 is approximately 13.8° C. higher than that of resin R-2 and approximately 23.7° C. higher than that of resin R-1.

As shown by the data above, poly(vinyl acetal) polymers made from resins containing pivalaldehyde (R-3), and even resins containing i-butyraldehyde (R-2) are able to produce polymer interlayers having improved properties over more conventional poly(vinyl acetal) polymers produced from other aldehydes (such as n-butyraldehyde). Using the same plasticizer type at the same plasticizer loading, a polymer interlayer made from resin R-3 has a higher glass transition temperature ($T_g$) but a lower melt viscosity than polymer interlayers made from resins R-1 and R-2. This may permit the use of lower amounts of plasticizer when, for example, such resins are used in interlayers. Alternatively, formulations containing poly(vinyl iso-butyral) or poly(vinyl pivalal) can be extruded at lower temperatures, which helps reduce thermal oxidative degradation of the interlayer that often causes yellowness and other visual quality defects. Lower melt viscosity may also enable faster extrusion rates, which may provide improved efficiencies and other commercial benefits.

The results presented in Table 1 above and FIGS. 1 and 2 underscore the importance of the amount of branching at the α-carbon. N-butyraldehyde does not have any branching at the α-carbon, while i-butyraldehyde has a single branch in the form of a methyl group and pivalaldehyde has two branches in the form of a pair of methyl groups attached to the α-carbon. While not wishing to be bound by theory, it is believed that this branching at the α-carbon effectively masks or shields the hydroxyl groups and reduces the polarity of the material. The results of the cloud point test seem to confirm these results as R-3 has the lowest cloud point, just more than half that of R-1. At a level of 19.1 weight percent residual hydroxyl groups, the cloud points of the three resins in 3GEH plasticizer were about 112.7° C., 78° C. and 58° C., for R-1, R-2 and R-3 respectively.

As shown above, poly(vinyl acetal) polymers produced using i-butyraldehyde tend to be less polar compared to a poly(vinyl acetal) polymer produced using n-butyraldehyde with the same residual hydroxyl level. The steric effects introduced by the branching at the α-carbon effectively mask the residual hydroxyl groups and reduce the polarity of the polymer. Increasing the branching at the α-carbon introduces further steric hindrance, and makes the polymer even less polar. For instance, a poly(vinyl acetal) polymer produced using pivalaldehyde has three methyl groups attached to the α-carbon, and has a cloud point temperature that is even lower than that of a poly(vinyl acetal) produced using i-butyraldehyde at the same residual hydroxyl level, as shown in FIG. 3. In addition, shorter side groups allow the polymer chains to get closer to each other forming a more tightly packed matrix. The net result is a resin or polymer that is less hydrophilic, more resistant to moisture and stiffer than the conventional poly(vinyl acetal) polymer made using n-butyraldehyde.

As seen from Table 1 above, poly(vinyl acetal) made from a branched aliphatic aldehyde such as i-butyraldehyde has significantly lower solution viscosity and cloud point temperature in 3GEH, and a significantly higher glass transition temperature compared to poly(vinyl acetal) made from a straight-chain aliphatic aldehyde such as n-butyraldehyde. Increasing the branching at the α-carbon results in a further decrease in solution viscosity and cloud point temperature in 3GEH as well as an increase in glass transition temperature, as shown above. This same observation holds when the residual hydroxyl level of the polymer is higher than approximately 19 weight percent.

Example 2

Additional resins and interlayers were prepared in the same way as described in Example 1 to provide formulations that can improve interlayer stiffness (as measured by $T_g$ and G') over wide ranges of temperatures and load durations, especially compared to conventional interlayers such as Saflex® DG structural interlayer. Poly(vinyl acetal) polymers with high residual hydroxyl content and shorter acetyl pendant groups can result in stiffer resins and interlayers, and particularly polymers having very high residual hydroxyl levels (at least 24 weight percent or more).

Three control interlayers (using resins made from PVnB) and five disclosed interlayers (using resins made from PViB) were produced. Sample S-1 was a sample of Saflex® DG41 interlayer that was cut from a commercial roll. The resin type (residual hydroxyl level) and amount of plasticizer are shown in Table 2 below. Each of the interlayers was tested for G' over a range of temperatures, $T_g$ and Loss Factor at $T_g$. Results are shown in Table 2 below.

As shown in Table 2, when the residual hydroxyl content is approximately 27 weight percent and the plasticizer content is 20 phr, an interlayer containing poly(vinyl iso-butyral) polymer has a glass transition temperature of approximately 56.8° C., which is approximately 5.3° C. higher than a corresponding poly(vinyl n-butyral) interlayer. The moduli of the PViB polymer at 50° C. and 20° C. are 443 and 29 MPa respectively. As seen from Table 2, both numbers are significantly higher than the corresponding values for the PVnB polymer. For example, a plasticized polymer made using i-butyraldehyde that has 27 weight percent residual hydroxyl groups (20 phr 3GEH) has $T_g$ and $G'_{50°\,C.}$ values that are significantly higher than those of a plasticized polymer made using n-butyraldehyde that has 28 weight percent residual hydroxyl groups (20 phr 3GEH).

TABLE 2

G', $T_g$ and LF at $T_g$ of various PVnB, and PViB formulations

| Resin Type | S-1 PVnB | S-2 PVnB | S-3 PVnB | S-4 PViB | S-5 PViB | S-6 PViB | S-7 PViB | S-8 PViB |
|---|---|---|---|---|---|---|---|---|
| % OH | 18.7 | 28 | 28 | 21.6 | 24 | 24 | 27 | 27 |
| Plasticizer (phr) | 20 | 20 | 22 | 20 | 20 | 25 | 20 | 25 |
| G' (20° C.) (MPa) | 281 | 278 | 247 | 377 | 451 | 348 | 443 | 351 |
| G' (50° C.) (MPa) | 1.3 | 6.0 | 4.2 | 3.8 | 10.1 | 1.9 | 28.8 | 8.3 |
| G' (60° C.) (MPa) | 0.7 | 1.2 | 1.1 | 0.9 | 1.2 | 0.7 | 2.5 | 1.5 |
| G' (70° C.) (MPa) | 0.6 | 0.8 | 0.7 | 0.6 | 0.7 | — | 0.9 | — |
| G' (80° C.) (MPa) | 0.6 | 0.7 | 0.6 | 0.5 | 0.6 | — | 0.7 | — |
| $T_g$ (° C.) | 43.0 | 51.6 | 49.1 | 49.9 | 53.1 | 47.9 | 56.8 | 51.5 |
| Loss Factor at $T_g$ | 1.77 | 1.07 | 0.90 | 1.45 | 1.58 | 1.49 | 1.12 | 0.99 |

As shown in Table 2, a sheet sample containing PViB resin with 24 weight percent residual hydroxyl groups and 20 phr plasticizer (S-5) has $T_g$ and $G'_{50°\,C.}$ of 53.1° C. and 10.1 MPa respectively. These values are not only considerably higher than those of interlayer sheets containing PVnB resin with 18.7 weight percent residual hydroxyl groups and the same amount of plasticizer (S-1), but they are also higher than those of interlayer sheets containing PVnB resin with 28 weight percent residual hydroxyl groups at the same plasticizer loading (S-2). An interlayer sheet containing PViB resin with 27 weight percent residual hydroxyl groups and 20 phr plasticizer has $T_g$ and $G'_{50°\,C.}$ of 56.8° C. and 28.8 MPa respectively (see S-7).

As shown in Table 2, interlayers containing PVnB polymers with 28 weight percent residual hydroxyl content and 20 phr 3GEH plasticizer (Sample S-2) have higher moduli than conventional stiff PVnB interlayers (Sample S-1) at temperatures exceeding about 43.5° C. However, at 20° C. the modulus of the PVnB of S-2 is slightly lower than that of the S-1 polymer. Increasing the plasticizer content from 20 to 22 phr has the expected result of lowering modulus at all temperatures as by Sample S-3. Samples S-4 to S-8 are interlayer sheets containing PViB polymers with a minimum of 20 or 25 phr 3GEH plasticizer (as shown in Table 2 above). Each of Samples S-4 to S-8 has a significantly higher modulus at 20° C. than samples S-1 to S-3. An interlayer with a higher modulus at 20° C., when used in certain types of laminates or glazings, such as hurricane glazings, can help reduce the laminate deflection in the cycling test component of the new hurricane performance standards. Furthermore, Samples S-5 and S-7 have significantly higher moduli over a wide temperature range when compared to conventional architectural interlayers (such as S-1). Sample S-7 has a modulus at 50° C. that is significantly higher (over 25 times) than that of S-1 (conventional interlayer) and almost 5 times greater than that of Sample S-2.

Figure 4:
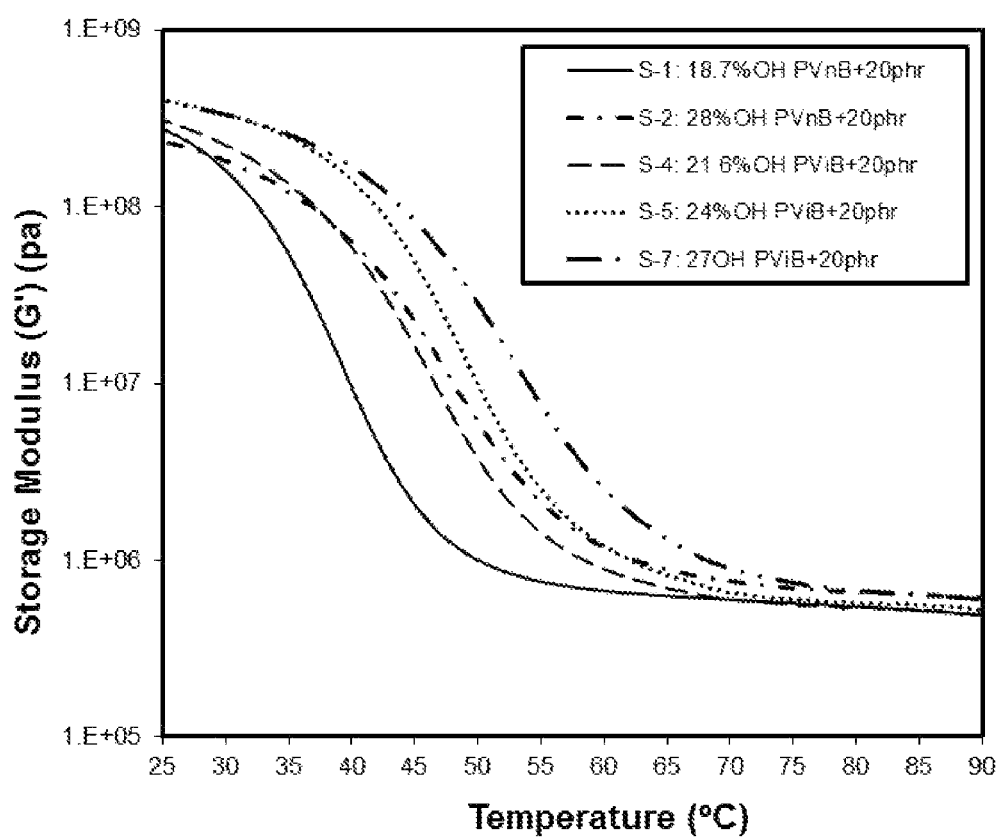
FIG. 4 is a graph depicting storage modulus versus temperature at different hydroxyl levels of various poly(vinyl acetal) polymers.
Figure 5:
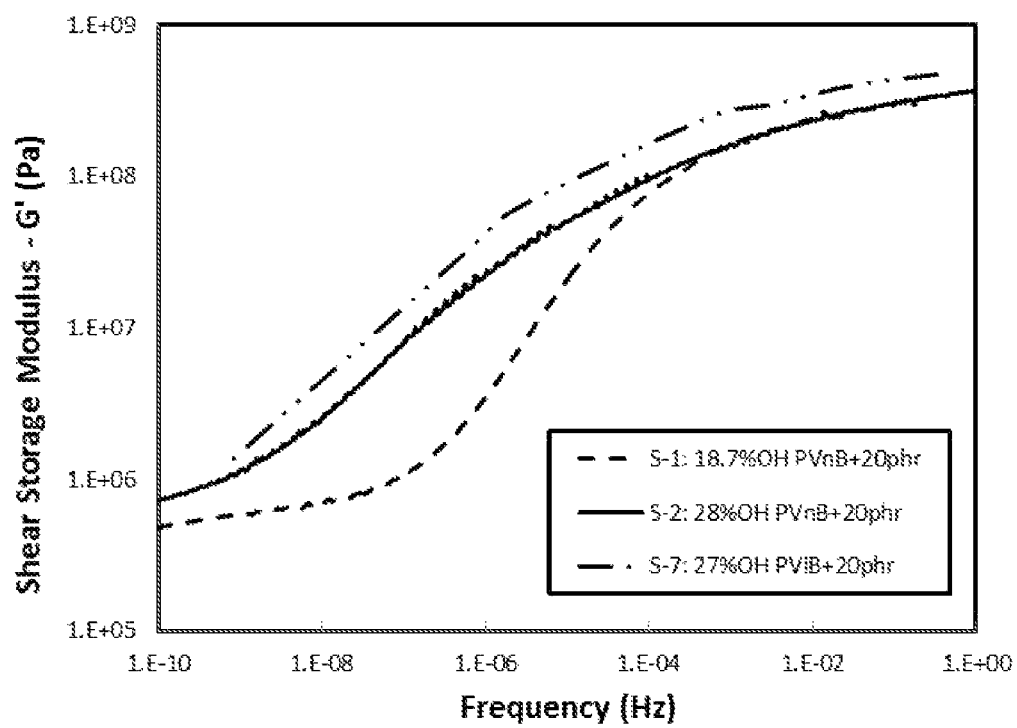
FIG. 5 is a graph depicting master curves at 20° C. for storage modulus versus frequency.

FIG. 4 shows the shear storage modulus as a function of temperature for conventional architectural PVnB (S-1) as well as high residual hydroxyl PVnB (S-2) and PViB based (S-4, S-5 and S-7) interlayers. FIG. 5 shows master curves at 20° C. for conventional architectural PVnB (S-1), high residual hydroxyl PVnB (S-2) and PViB (S-7) interlayers. As shown by FIG. 5, the modulus of Sample S-2 approaches that of conventional architectural PVnB (S-1) at frequencies exceeding $10^{-4}$ Hz. The low load duration events (such as Wind Load, Personal Balustrade Loads, etc.) fall in this frequency region. At frequencies lower than $10^{-4}$ Hz, the modulus of Sample S-2 tends to be higher than that of Sample S-1. Sample S-7 is the only sample that shows a consistently higher modulus than that of conventional architectural PVnB (S-1) over the entire range of frequencies ($10^{-10}$ Hz<ω<1 Hz).

Table 3 below shows the moduli for some of the different interlayers in Table 2 at load durations defined in European Standard prEN16613. The interlayers include a conventional architectural PVnB (S-1), a high residual hydroxyl level (28 wt. %) PVnB at 20 and 22 phr (S-2 and S-3), and PViB at 24 weight percent and 27 weight percent residual hydroxyl levels and 20 phr (S-5 and S-7 respectively).

TABLE 3

Moduli at different load durations (European standard prEN16613)

| | Wind | Personal Balustrade Loads- Normal Duty | Personal Balustrade Loads- Crowds | Glass for Walking on for Maintenance | Snow Loads- External Canopies and Roofs of Unheated Building | Snow Loads- Roofs of Heated Building | Permanent |
|---|---|---|---|---|---|---|---|
| Duration | 3 sec. | 30 sec. | 5 min. | 30 min. | 5 days | 3 weeks | 50 years |
| Freq. (Hz) | $3.3 \times 10^{-01}$ | $3.3 \times 10^{-02}$ | $3.3 \times 10^{-03}$ | $5.6 \times 10^{-04}$ | $2.3 \times 10^{-06}$ | $5.5 \times 10^{-07}$ | $6.3 \times 10^{-10}$ |
| | MPa | MPa | MPa | MPa | MPa | MPa | MPa |
| S-1 | 341 | 275 | 202 | 140 | 7 | 2 | 0.6 |

TABLE 3-continued

Moduli at different load durations (European standard prEN16613)

| | Wind | Personal Balustrade Loads- Normal Duty | Personal Balustrade Loads- Crowds | Glass for Walking on for Maintenance | Snow Loads- External Canopies and Roofs of Unheated Building | Snow Loads- Roofs of Heated Building | Permanent |
|---|---|---|---|---|---|---|---|
| S-2 | 341 | 273 | 201 | 143 | 31 | 19 | 1 |
| S-2 improve vs. S-1 (%) | 0 | −1 | 0 | 2 | 343 | 850 | 67 |
| S-3 | 210 | 138 | 84 | 56 | 8 | 4 | 0.6 |
| S-3 improve vs. S-1 (%) | −38 | −50 | −58 | −60 | 14 | 100 | 0 |
| S-5 | 477 | 399 | 296 | 243 | 38.7 | 15.6 | 0.6 |
| S-5 improve vs. S-1 (%) | 40 | 45 | 47 | 74 | 453 | 680 | 0 |
| S-7 | 477 | 407 | 302 | 250 | 61 | 31 | 1.2 |
| S-7 improve vs. S-1 (%) | 40 | 48 | 49 | 79 | 768 | 1460 | 94 |

As seen from Table 3, the modulus of Sample S-7 is at least 40% higher than that of Sample S-1 at any load duration, and the improvement is particularly significant in the intermediate load duration events (such as Snow Load—External Canopies and Roofs of Unheated Buildings and Snow Load—Roofs of Heated Buildings).

Figure 6:
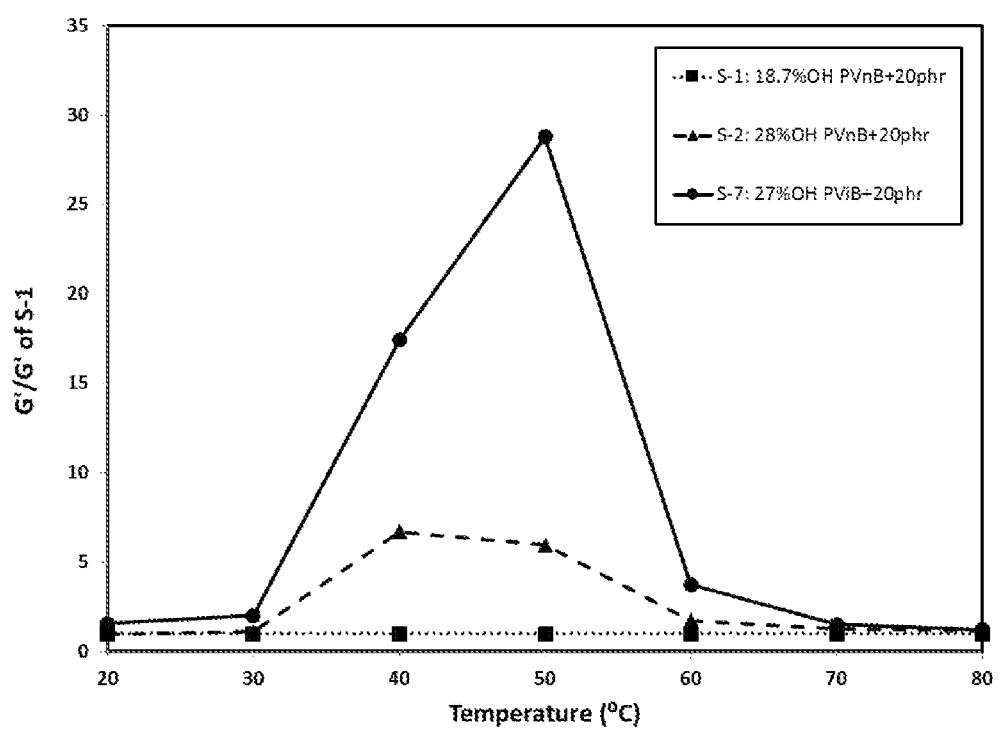
FIG. 6 is a graph depicting the storage moduli of plasticized PVnB and PViB formulations normalized by that of a conventional architectural interlayer as a function of temperature.

FIG. 6 shows the shear storage modulus of two different interlayers normalized by that of a conventional architectural PVnB (S-1) sheet over a temperature range of 20 to 80° C. FIG. 6 shows the moduli of an interlayer containing PVnB polymer containing 28 weight percent residual hydroxyl content and 20 phr 3GEH plasticizer (S-2) and an interlayer containing PViB polymer having 27 weight percent residual hydroxyl content and 20 phr 3GEH plasticizer (S-7). As shown by FIG. 6, the sample containing PViB not only enhances the stiffness advantage near the lower end of the temperature range (20 to 30° C.) but also extends the advantage over the intermediate range. The enhancement is particularly significant between 30° C. and 60° C., a range that is important in architectural glazing applications.

Interlayers having higher G' values at room temperature help reduce the laminate deflection in the cycling test component of the new hurricane performance standards, which are carried out under ambient conditions. Specifically, significantly higher G' values up to 50° C. compared to conventional architectural PVnB will help reduce loss of interlayer stiffness at elevated temperatures. At higher temperatures, conventional architectural PVnB suffers from loss of performance compared to other interlayers. An interlayer containing PViB with residual hydroxyl content of 27 weight percent and 20 phr 3GEH plasticizer (such as Sample S-7) has better performance in terms of its modulus at temperatures up to 50° C. compared to other materials, as shown in Table 2.

Samples comprising PViB have higher G' over a wide range of measurement frequencies ($10^{-10} < \omega < 10^1$ Hz) and load durations (3 seconds to 50 years). For example, at 20° C., the G' of conventional automotive PVnB interlayer falls to approximately 3 MPa in 30 seconds. At 20° C., the G' of the conventional architectural PVnB interlayer (S-1) falls to approximately 3 MPa in 1 week. At 20° C., the G' of an interlayer containing PVnB polymer containing 28 weight percent residual hydroxyl content and 20 phr 3GEH plasticizer (S-2) falls to approximately 3 MPa in 2.2 years. Finally, at 20° C., the G' of an interlayer containing PViB polymer having 27 weight percent residual hydroxyl content and 20 phr 3GEH plasticizer (S-7) falls to approximately 3 MPa in 7.9 years. A higher modulus over longer durations will improve the performance of the post-glass breakage laminate.

A glass laminate or glazing containing a PViB polymer having residual hydroxyl content greater than 22, or greater than 23, or greater than 24, or greater than 25, or greater than 26, or at least 27 weight percent and 20 phr 3GEH plasticizer will likely improve the flexural resistance compared to laminated glass comprising conventional architectural PVnB, particularly at elevated temperatures (such as greater than about 35° C.). The higher stiffness of PViB polymers will help reduce laminate deflection for a given cantilever force or maintain the same deflection for a higher cantilever force, such as that encountered in balcony or balustrade applications. The higher intrinsic stiffness of PViB polymers over a wide temperature range will help maintain structural integrity of light weight glazings or laminates, such as those made using thin glass. The higher modulus at elevated temperatures and under short duration loads of the PViB polymers having high residual hydroxyl content will allow laminates comprising these PViB interlayers to maintain the required rigidity over a broad range of ambient conditions, and particularly in warmer climates.

Example 3

Several mixed poly(vinyl acetal) resins were prepared in a similar manner as described in Example 1 above. The residual hydroxyl content of the resulting mixed poly(vinyl acetal) resins was determined using both FTIR and the titration methods described above. All resins had a residual acetate content of about 2 weight percent.

Resin R-11 was a standard commercial grade poly(vinyl n-butyral) polymer resin with a residual hydroxyl level of approximately 18.7 weight percent made from medium molecular weight PVOH. Resin R-21 was poly(vinyl i-butyral) resin having a residual hydroxyl level of about 18.7 weight percent made from a 95:5 blend of medium and low molecular weight PVOH and lightly cross-linked. Resin R-31 was made by making multiple small batches having residual hydroxyl levels ranging from about 21.7 to 23.3 weight percent and then blending the resins to form a composite sample having a residual hydroxyl level of about 21.8 weight percent. Resin R-41 was a commercial grade poly(vinyl n-butyral) polymer resin with a residual hydroxyl level of about 22.0 weight percent. Resins R-11, R-21, R-31 and R-41 were then extruded in the combinations shown in Table 4a below using the procedures previously described. For Samples C, E and F in Table 4a, the two different resins were pre-blended before adding the plasticizer. To each blend, 38 phr of 3GEH plasticizer (and other standard additives) was added. Two 3"×6" laminates were prepared for moisture, gauge, haze, YI, L, a, b, % T and % Tuv measurements. Two 6"×6" laminates were made by stacking five layers of each interlayer sheet to measure the HLD haze. All sheet samples were dried in a desiccator for a minimum of 48 hours prior to analysis. Optical properties of the resins are shown in Table 4a and HLD haze results are shown in Table 4b below.

TABLE 4a

Optical Properties

| Resin/Sample | A | B | C | D | E | F |
|---|---|---|---|---|---|---|
| PVnB Resin R-11 (wt. %) | 100 | 0 | 50 | 0 | 50 | 50 |
| PViB Resin R-21 (wt. %) | 0 | 100 | 50 | 0 | 0 | 0 |
| PViB Resin R-31 (wt. %) | 0 | 0 | 0 | 100 | 50 | 0 |
| PVnB Resin R-41 (wt. %) | 0 | 0 | 0 | 0 | 0 | 50 |
| % Moisture | 0.42 | 0.39 | 0.42 | 0.42 | 0.42 | 0.45 |
| Thickness | 30.2 | 27.9 | 28.7 | 26.4 | 28.7 | 30.0 |
| % Tuv (ISO13837) | 11.4 | 11.1 | 10.8 | 11.2 | 11.2 | 11.0 |
| X | 83.16 | 83.12 | 81.01 | 83.03 | 83.08 | 82.08 |
| Y | 88.54 | 88.49 | 86.21 | 88.43 | 88.46 | 87.34 |
| Z | 94.11 | 94.15 | 90.49 | 94.02 | 94.11 | 92.15 |
| L* | 95.39 | 95.37 | 94.40 | 95.34 | 95.36 | 94.88 |
| a* | −1.50 | −1.49 | −1.40 | −1.55 | −1.52 | −1.41 |
| b* | 0.62 | 0.56 | 1.40 | 0.60 | 0.57 | 1.09 |
| YI (ASTM D1925) | −0.25 | −0.36 | 1.34 | −0.35 | −0.37 | 0.73 |
| Haze % | 0.15 | 0.20 | 0.35 | 0.15 | 0.10 | 0.20 |

TABLE 4b

Resin Blend Ratios and HLD Values

| Resin/Sample | PVnB Resin R-11 (wt %) | PViB Resin R-21 (wt %) | PViB Resin R-31 (wt %) | PVnB Resin R-41 (wt %) | Delta OH (%) | HLD Haze |
|---|---|---|---|---|---|---|
| A | 100 | 0 | 0 | 0 | — | 0.18 |
| B | 0 | 100 | 0 | 0 | — | 0.70 |
| C | 50 | 50 | 0 | 0 | 0 | 1.93 |
| D | 0 | 0 | 100 | 0 | — | 0.50 |
| E | 50 | 0 | 50 | 0 | 3.1 | 0.35 |
| F | 50 | 0 | 0 | 50 | 3.3 | 1.07 |

The data in Tables 4a and 4b above shows that using a resin having residues of a single aldehyde (i.e., PVnB or a PViB resin at 100%) produced samples having low HLD Haze values (of ≤0.70 for Samples A, B and D) and better overall optical properties. Sample C, which was a 50/50 blend of resins R-11 and R-21 (PVnB and PViB resins having very similar residual hydroxyl levels), had a significantly higher HLD Haze value (of 1.93) although the residual hydroxyl level of the two resins was nearly identical. Sample F, which was also a 50/50 blend of two resins (R-11 and R-41), was a blend of two PVnB resins whose residual hydroxyl levels differed by about 3 weight percent. As expected, Sample F had high HLD Haze (1.07) due to the relatively large residual hydroxyl level difference between the two PVnB resins. Sample E, which was a 50/50 blend of a PVnB and a PViB resin having residual hydroxyl levels that again differed by about 3 weight percent, had a significantly lower HLD Haze level (0.35) compared to Sample F. As seen from Table 4a, Sample E also had the lowest haze level of all tested samples indicating excellent compatibility between Resins R-11 and R-31.

Example 4

Figure 7:
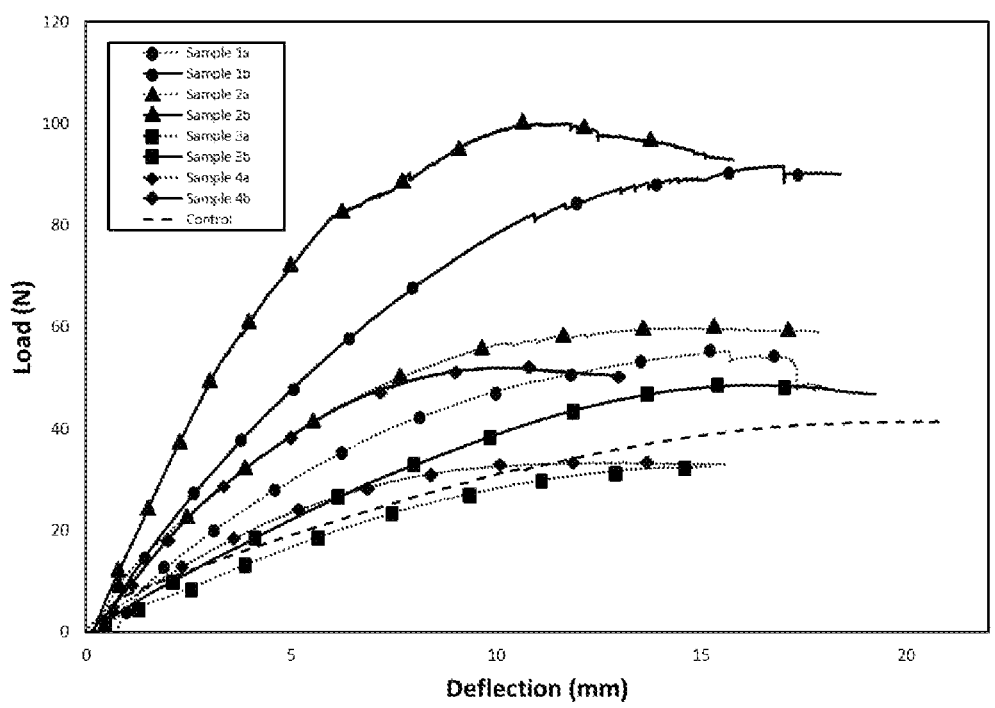
FIG. 7 is a graph depicting the post-glass breakage three point bending stiffness of multiple layer interlayers.

Additional PVnB and PViB resins were produced and used to make interlayers in multiple thicknesses as previously described. Plasticizer (3GEH) was added in the amounts shown in Table 5 below. These interlayers were then used to make multilayer interlayers in the thicknesses and configurations shown below in Table 5. The skin and core layers described in Table 5 could alternatively be co-extruded to produce a single multilayer film, and as long as the absolute thicknesses and compositions of the skin and core layers remain unchanged, the properties of a single co-extruded multilayer film would resemble those of a multilayer film constructed by laminating individually extruded skin and core layers. Furthermore, the skin and core layers described in Table 5 may include various other additives to impart particular properties or features to the interlayer as previously described. A control sample of Saflex™ VSO2 interlayer having PVnB outer layers and a PET inner layer was also made. The samples were laminated between two pieces of 3.0 mm thick clear glass and were tested for pre-glass breakage three-point bending stiffness according to ASTM D790 procedure. Post-glass breakage three-point bending stiffness was also measured, and the results are shown in FIG. 7.

TABLE 5

Multilayer Constructions

| Sample | Skin Resin | Skin OH (wt. %) | Skin Plasticizer (phr) | Skin Thickness (mil) | Core Resin | Core OH (wt. %) | Core Plasticizer (phr) | Core Thickness (mil) | Total Thickness (mil) | Pre-glass Breakage Bending Stiffness at room temp. (N/mm) | Bending Stiffness at Ultimate Load (N/mm) |
|---|---|---|---|---|---|---|---|---|---|---|---|
| 1a | PVnB | 18.7 | 30 | 15 | PVnB | 28 | 20 | 60 | 90 | 210 | 3.55 |
| 1b | PVnB | 18.7 | 30 | 15 | PViB | 27 | 20 | 60 | 90 | 230 | 5.56 |
| 2a | PVnB | 18.7 | 27.5 | 15 | PVnB | 28 | 20 | 60 | 90 | 280 | 4.14 |
| 2b | PVnB | 18.7 | 27.5 | 15 | PViB | 27 | 20 | 60 | 90 | 275 | 8.33 |
| 3a | PVnB | 18.7 | 30 | 30 | PVnB | 28 | 20 | 30 | 90 | 170 | 2.13 |
| 3b | PVnB | 18.7 | 30 | 30 | PViB | 27 | 20 | 30 | 90 | 185 | 3.06 |
| 4a | PVnB | 18.7 | 27.5 | 30 | PVnB | 28 | 20 | 30 | 90 | 225 | 2.87 |

TABLE 5-continued

Multilayer Constructions

| Sample | Skin Resin | Skin OH (wt. %) | Skin Plasticizer (phr) | Skin Thickness (mil) | Core Resin | Core OH (wt. %) | Core Plasticizer (phr) | Core Thickness (mil) | Total Thickness (mil) | Pre-glass Breakage Bending Stiffness at room temp. (N/mm) | Bending Stiffness at Ultimate Load (N/mm) |
|---|---|---|---|---|---|---|---|---|---|---|---|
| 4b | PVnB | 18.7 | 27.5 | 30 | PViB | 27 | 20 | 30 | 90 | 240 | 4.95 |
| 5  | PVnB | 18.7 | 30   | 35 | PET  | 28 | 20 | 7  | 77 | 150 | 2.08 |

Table 5 compares the pre-glass breakage bending stiffness of the laminates having PVnB cores and PViB cores with PVnB skins at different thicknesses. As seen by the data in Table 5, the pre-glass breakage bending stiffness is influenced by the stiffness of the softest layer, which in this case is the skin layer. The stiffness of the softest layer is a function of its thickness and modulus at the specific test conditions. For example, comparing Samples 1a and 2a (which have the same core layers), the skin layers are the same thickness, but Sample 2a has a lower plasticizer level (27.5 phr vs 30 phr). The lower level of plasticizer in the skin layers of Sample 2a makes the skin layers stiffer and increases the bending stiffness of Sample 2a by approximately 33% compared to Sample 1a. A similar observation can be made for Samples 3a and 4a.

The stiffness of the stiffer core layer also influences the pre-glass breakage bending stiffness of the multiple layer interlayer, but its contribution to overall bending stiffness appears to be smaller. At 25° C., the shear storage moduli (G') of the core layers in Samples 1a and 1b are approximately 232 MPa and 394 MPa respectively (measured according to the DMTA procedure previously described). The core layer of Sample 1b is almost 70% stiffer than the core layer of Sample 1a, but the bending stiffness of interlayer Sample 1b is only about 9.5% higher than that of interlayer Sample 1a. Comparing Samples 3a and 3b and Samples 4a and 4b, the difference is even less, and for Samples 2a and 2b, the difference is −2%. This shows that at the same residual hydroxyl levels and plasticizer levels, the pre-glass bending stiffness levels of multiple layer interlayers with PViB core layers are only slightly higher or almost the same as those of multiple layer interlayers with PVnB core layers.

The post-glass breakage data shown in Table 5 and FIG. 7 shows a very different picture. In the post-glass breakage state, the overall mechanical properties are much more strongly influenced by the stiffness of the stiffest layer. For example, the bending stiffness at ultimate load for Sample 1b is about 91 N whereas that for Sample 1a is approximately 55 N (an improvement of 65% with the PViB core). This improvement is similar to the difference in shear storage moduli between the two cores (of Samples 1a and 1b). The bending stiffness at ultimate load for Sample 2b is about 67% higher than that for Sample 2a. As a result of higher stiffness, the center deflection for a given load is also lower for interlayers containing PViB cores compared to those containing conventional PVnB cores. Sample 1a, for example, had a center deflection of 5.2 mm under 40 N load, while Sample 1b resulted into a center deflection of only 2.4 mm under the same load. The interlayers containing PViB cores consistently showed higher bending stiffness at ultimate load compared to those containing PVnB cores. For example, Sample 1b (with total interlayer thickness of about 2.29 mm and core thickness of about 1.53 mm) has a bending stiffness at ultimate load of 5.56 N/mm whereas corresponding Sample 1a has a bending stiffness at ultimate load of only 3.55 N/mm. Sample 1a has the same total and core thickness values as those of Sample 1b, but Sample 1b has a PViB core whereas Sample 1a has a PVnB core. Similarly, Sample 3b (with total interlayer thickness of about 2.29 mm) has a bending stiffness at ultimate load of 3.06 N/mm whereas Sample 3a (with the same total and core thickness values) has a bending stiffness at ultimate load of only 2.13 N/mm. Again, the difference is that Sample 3b has a PViB core whereas Sample 3a has a PVnB core. Note that for post glass breakage bending stiffness, glass thickness of 3 mm for both sides was used, and the measurements were averaged over 3 samples. The procedure used was similar to ASTM D790-10.

The difference in post-glass breakage three-point bending stiffness of laminates containing multilayer interlayer films with PVnB or PViB cores is expected to become even more pronounced at higher temperatures. The interlayers with PViB cores made with resins having residual hydroxyl levels in excess of 22, or more than 23, or more than 24, or more than 25, or more than 26, or even more than 27 weight percent are more effective in maintaining their shear storage modulus at temperatures of 30, 40, 50, and 60° C. compared to PVnB interlayers having the same residual hydroxyl levels. This is also true for the performance under long load durations as these PViB interlayers are more effective in maintaining their modulus under long load durations.

The results in Table 5 demonstrate that the superior stiffness of a PViB layer compared to a PVnB layer translates to superior stiffness of a multilayer interlayer containing the PViB layer in its core, and the improvement is particularly significant when one or both glass panes of multilayer panel are broken. Consequently, such multilayer films having PViB layers (such as core layers) can offer performance benefits in structural, storm or hurricane applications where post-glass breakage laminate is expected to withstand either cyclical (such as wind) or static (such as snow buildup) loads with minimum deflection.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizer in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. An interlayer comprising: a resin layer comprising a poly(vinyl acetal) resin and a plasticizer, wherein the poly (vinyl acetal) resin has a residual hydroxyl content of at least 24 weight percent and comprises at least 10 weight percent of residues of at least one aldehyde other than n-butyraldehyde, and wherein the residues of the at least one aldehyde other than n-butyraldehyde is iso-butyraldehyde or pivalaldehyde, based on the total weight of aldehyde residues of the poly(vinyl acetal) resin, and wherein the resin layer has a glass transition temperature greater than 45° C.

2. The interlayer of claim 1, wherein the plasticizer is present in the resin layer in an amount in the range of from 5 to 30 phr and wherein the glass transition temperature of the resin layer is at least 46° C.

3. The interlayer of claim 1, wherein the plasticizer is present in the resin layer in an amount in the range of from 5 to 20 phr and wherein the glass transition temperature of the resin layer is at least 47° C.

4. The interlayer of claim 1, wherein the plasticizer is present in the resin layer in an amount in the range of from 5 to 20 phr and wherein the glass transition temperature of the resin layer is at least 50° C.

5. The interlayer of claim 1, wherein the plasticizer is present in the resin layer in an amount of not more than 20 phr and wherein the glass transition temperature of the resin layer is at least 55° C.

6. The interlayer of claim 1, wherein the poly(vinyl acetal) resin comprises at least 50 weight percent of the residues of at least one aldehyde other than n-butyraldehyde, based on the total weight of aldehyde residues of the poly(vinyl acetal) resin.

7. The interlayer of claim 1, wherein the poly(vinyl acetal) resin comprises at least 75 weight percent of the residues of at least one aldehyde other than n-butyraldehyde, based on the total weight of aldehyde residues of the poly(vinyl acetal) resin.

8. The interlayer of claim 1, wherein the interlayer has a storage modulus, G', at 20° C. of at least 300 MPa, and a storage modulus, G', at 50° C. of at least 10 MPa as measured by DMTA at a measurement frequency of 1 Hz and sweep rate of 3° C./min.

9. The interlayer of claim 1, where the interlayer has a storage modulus, G', at 20° C. and a measurement frequency of $3.33 \times 10^{-3}$ Hz of at least 250 MPa, and storage modulus, G', at 20° C. and a measurement frequency of $5.56 \times 10^{-4}$ Hz of at least 200 MPa as measured by DMTA at a sweep rate of 3° C./min.

10. A multiple layer panel comprising the interlayer of claim 1.

11. An interlayer comprising:
a resin layer comprising:
a poly(vinyl acetal) resin, wherein the poly(vinyl acetal) resin has a residual hydroxyl content of at least 24 weight percent and comprises at least 50 weight percent of residues of at least one aldehyde other than n-butyraldehyde, wherein the residues of the at least one aldehyde other than n-butyraldehyde is iso-butyraldehyde or pivalaldehyde, based on the total weight of aldehyde residues of the poly(vinyl acetal) resin,
and from 5 to 30 phr of a plasticizer,
and wherein the resin layer has a glass transition temperature greater than 45° C.

12. The interlayer of claim 11, wherein the plasticizer is present in the resin layer in an amount in the range of from 5 to 25 phr and wherein the glass transition temperature of the resin layer is at least 47° C.

13. The interlayer of claim 11, wherein the plasticizer is present in the resin layer in an amount of not more than 20 phr and wherein the glass transition temperature of the resin layer is at least 55° C.

14. The interlayer of claim 11, wherein the poly(vinyl acetal) resin has a residual hydroxyl content of at least 27 weight percent and comprises at least 50 weight percent of residues of at least one aldehyde other than n-butyraldehyde, based on the total weight of aldehyde residues of the poly(vinyl acetal) resin.

15. The interlayer of claim 11, wherein the poly(vinyl acetal) resin comprises at least 75 weight percent of the residues of at least one aldehyde other than n-butyraldehyde, based on the total weight of aldehyde residues of the poly(vinyl acetal) resin.

16. The interlayer of claim 11, wherein the interlayer has a storage modulus, G', at 20° C. of at least 300 MPa, and a storage modulus, G', at 50° C. of at least 10 MPa as measured by DMTA at a measurement frequency of 1 Hz and sweep rate of 3° C./min.

17. An interlayer comprising:
a resin layer comprising:
a poly(vinyl acetal) resin, wherein the poly(vinyl acetal) resin has a residual hydroxyl content of at least 24 weight percent and comprises at least 50 weight percent of residues of iso-butyraldehyde or pivaldehyde, based on the total weight of aldehyde residues of the poly (vinyl acetal) resin,
and from 5 to 20 phr of a plasticizer,
and wherein the resin layer has a glass transition temperature greater than 50° C.

18. The interlayer of claim 17, wherein the interlayer has a storage modulus, G', at 20° C. of at least 300 MPa, and a storage modulus, G', at 50° C. of at least 10 MPa as measured by DMTA at a measurement frequency of 1 Hz and sweep rate of 3° C./min.

* * * * *